(12) United States Patent
Fujii et al.

(10) Patent No.: US 7,363,892 B2
(45) Date of Patent: Apr. 29, 2008

(54) ENGINE VALVE OPERATING SYSTEM

(75) Inventors: Noriaki Fujii, Wako (JP); Akiyuki Yonekawa, Wako (JP); Katsunori Nakamura, Wako (JP); Kazunari Kaneshima, Wako (JP); Yousuke Kohara, Wako (JP); Tomoya Fujimoto, Wako (JP); Ryou Horiuchi, Wako (JP); Keiko Yoshida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 139 days.

(21) Appl. No.: 10/584,500

(22) PCT Filed: Dec. 21, 2004

(86) PCT No.: PCT/JP2004/019084

§ 371 (c)(1),
(2), (4) Date: Jun. 22, 2006

(87) PCT Pub. No.: WO2005/064124

PCT Pub. Date: Jul. 14, 2005

(65) Prior Publication Data

US 2007/0144471 A1 Jun. 28, 2007

(30) Foreign Application Priority Data

| Dec. 25, 2003 | (JP) | ............................. 2003-430710 |
| Dec. 26, 2003 | (JP) | ............................. 2003-433595 |
| Dec. 26, 2003 | (JP) | ............................. 2003-434055 |
| Jan. 5, 2004 | (JP) | ............................. 2004-000429 |

(51) Int. Cl.
*F01L 1/34* (2006.01)

(52) U.S. Cl. .............................. 123/90.16; 123/90.15; 123/90.17; 123/90.31

(58) Field of Classification Search .............. 123/90.16
See application file for complete search history.

(56) References Cited

U.S. PATENT DOCUMENTS

| 6,892,684 B2 * | 5/2005 | Pattakos et al. ......... 123/90.16 |
| 7,207,300 B2 * | 4/2007 | Ezaki et al. ............. 123/90.16 |

FOREIGN PATENT DOCUMENTS

| JP | 06-280523 | 10/1994 |
| JP | 8-74534 | 3/1996 |
| JP | 2004-36560 | 2/2004 |
| JP | 2004-353599 | 12/2004 |

* cited by examiner

*Primary Examiner*—Thomas Denion
*Assistant Examiner*—Kyle M. Riddle
(74) *Attorney, Agent, or Firm*—Kratz, Quintos & Hanson, LLP

(57) ABSTRACT

First and second connecting portions 61a and 62a are arranged in parallel and relatively turnably connected to a rocker arm 36 and a movable support portion 62b of a second link arm 62 is placed nearer to an engine valve 19 than a fixed support portion 61b of a first link arm 61. This makes it possible to decrease the size of a valve operating system and ensure the follow-up ability of the opening/closing operation as well as to vary a lift amount of the engine valve continuously while maintaining the reliability and durability of drive means.

12 Claims, 21 Drawing Sheets

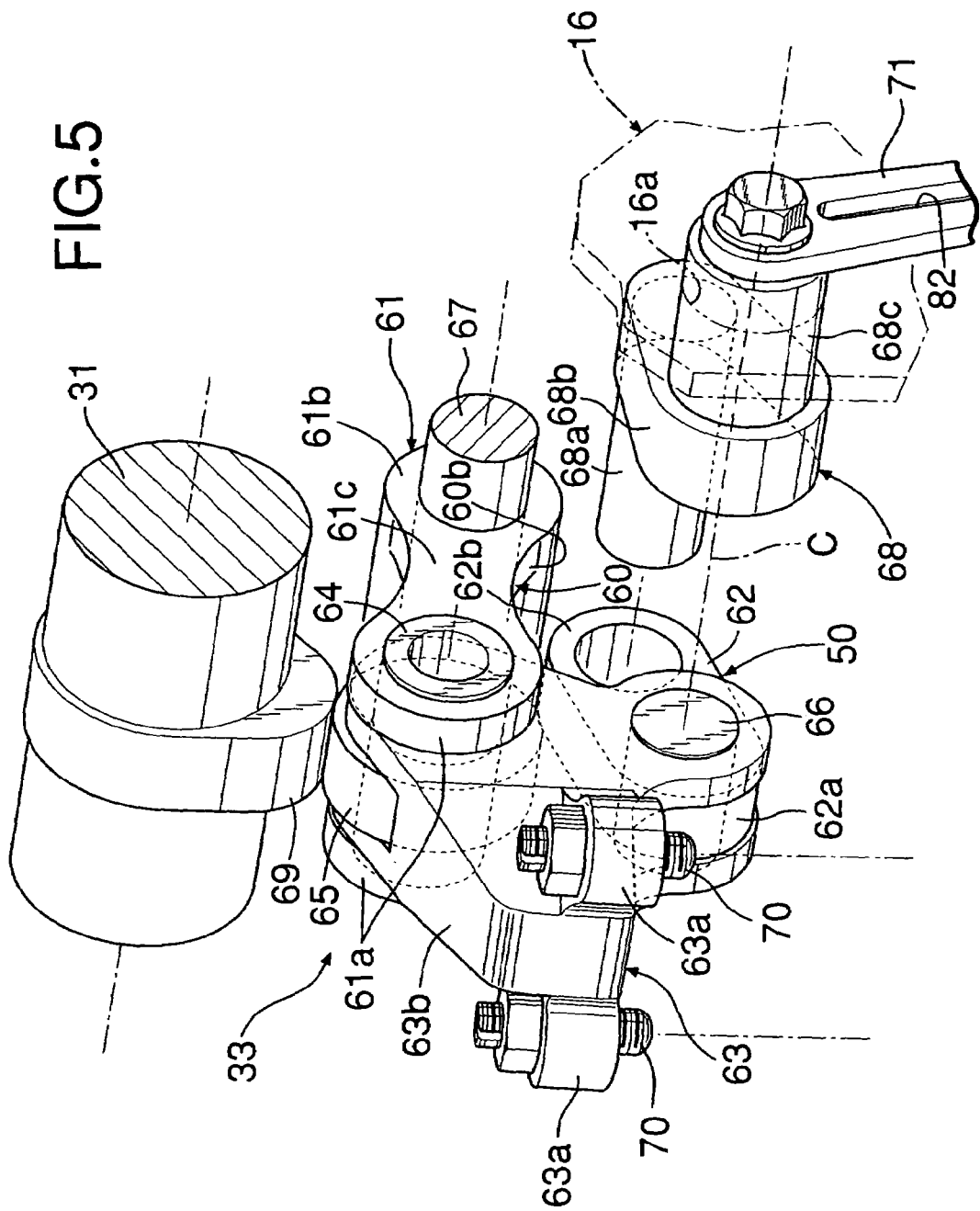

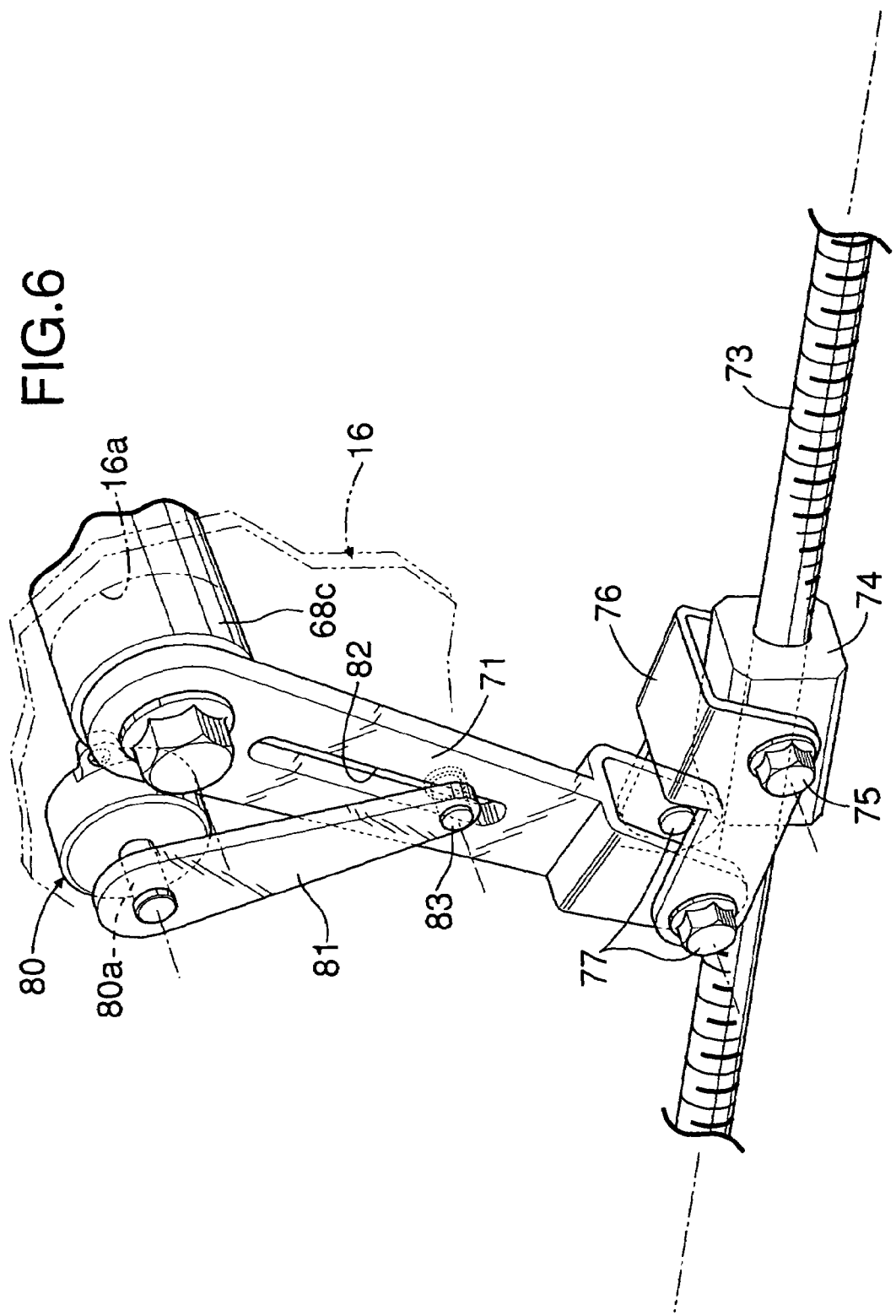

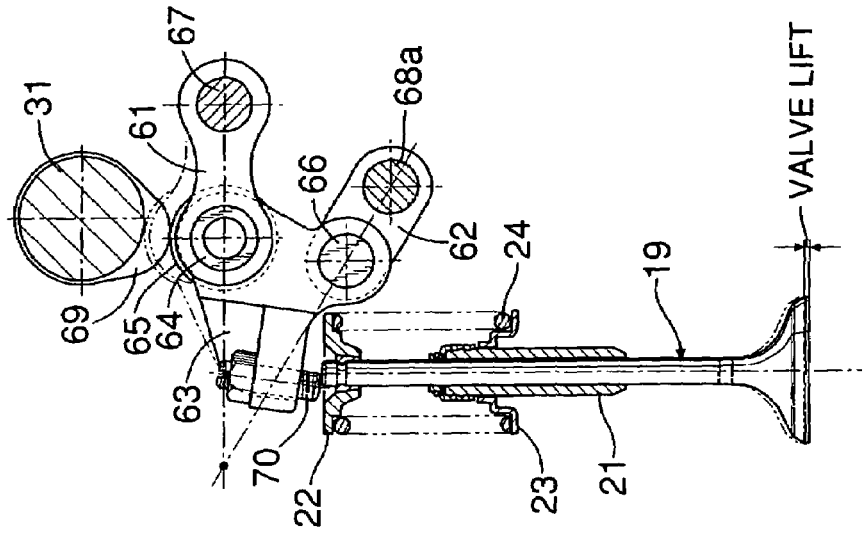
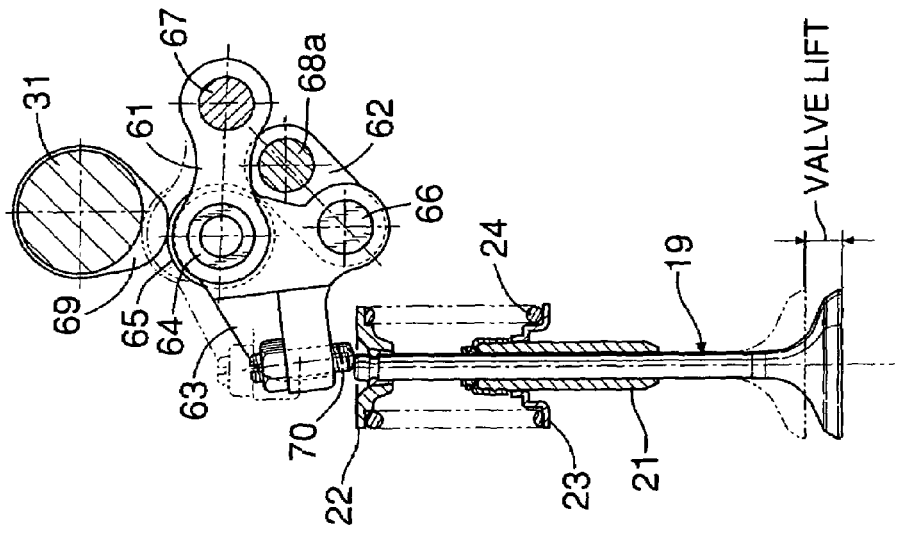

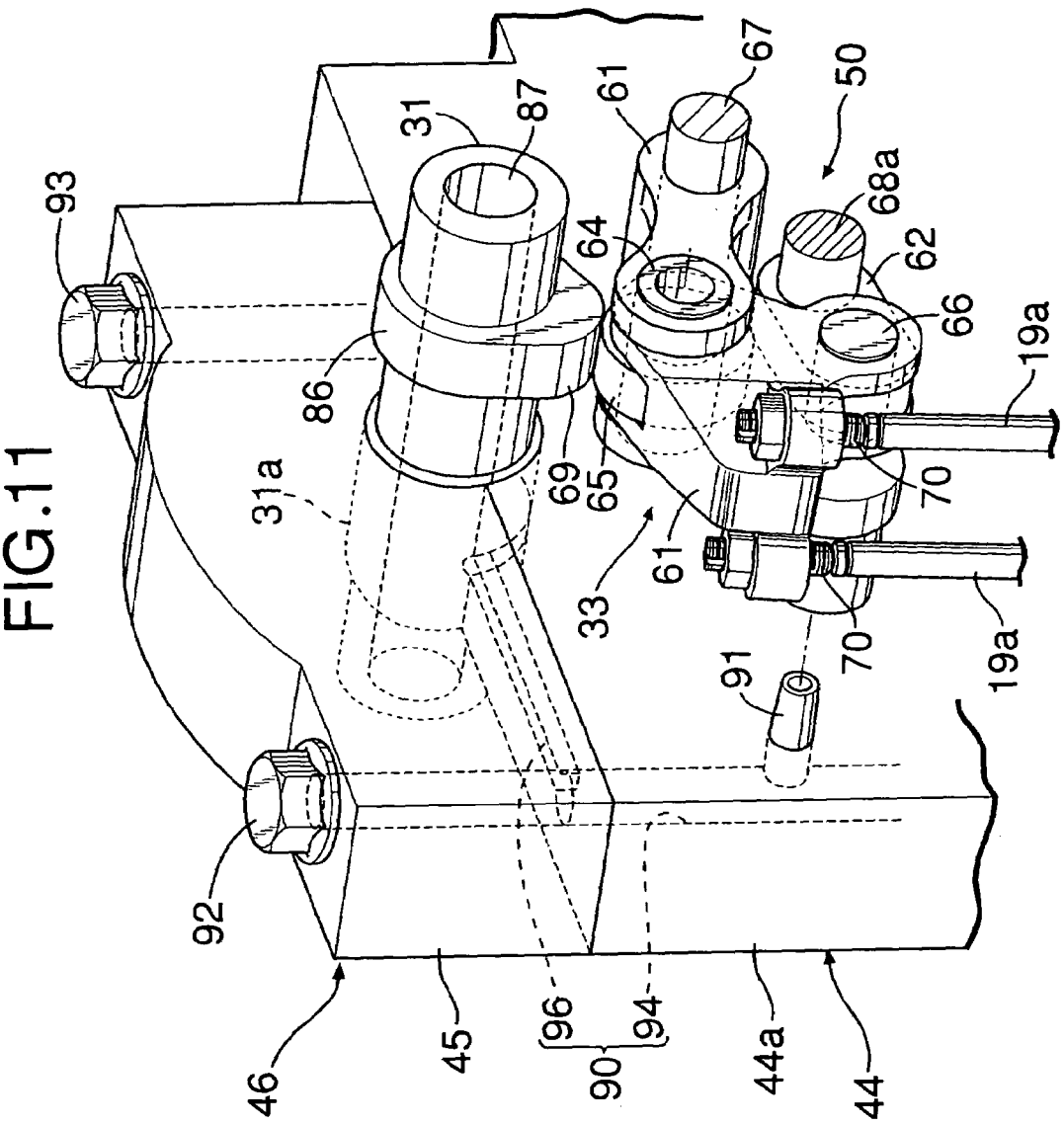

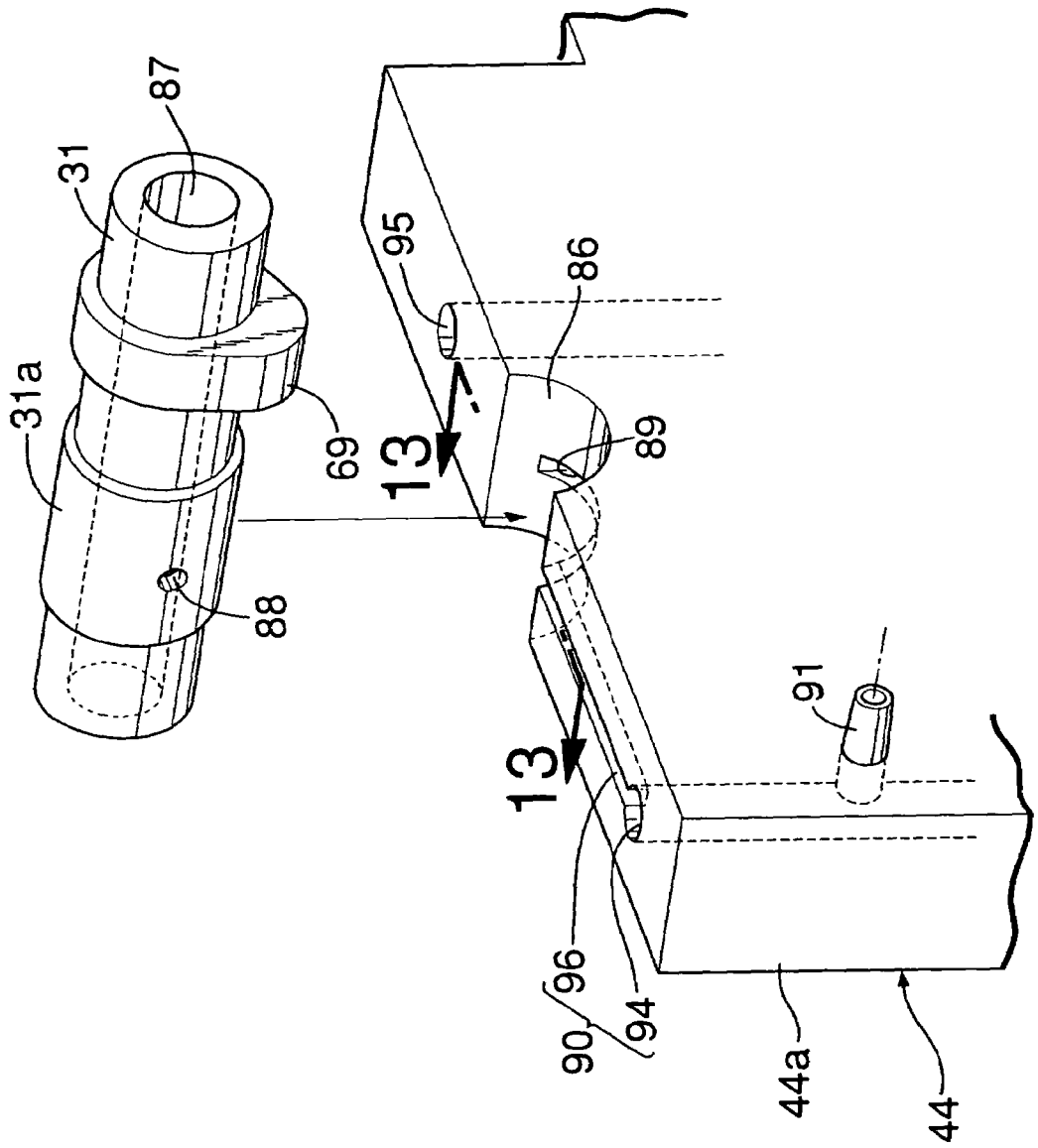

ENGINE VALVE OPERATING SYSTEM

TECHNICAL FIELD

The present invention relates to an engine valve operating system equipped with a variable valve lift mechanism which continuously varies the lift amount of an engine valve, namely an intake valve or exhaust valve.

BACKGROUND ART

A valve operating system in which one end of a push rod is fitted to one end of a rocker arm having a valve abutment part abutting to an engine valve at the other end side and a link mechanism is provided between the other end of the push rod and a valve operating cam in order to continuously change the amount of lift of the engine valve is already known by Patent Document 1.

However, in the conventional valve operating system disclosed in Patent Document 1, it is necessary to ensure a comparatively large space to dispose a link mechanism and the push rod therein, between the valve operating cam and the rocker arm, and therefore, the valve operating system becomes large in size. In addition, a driving force from the valve operating cam is transmitted to the rocker arm via the link mechanism and the push rod, and therefore, it is difficult to say that follow-up ability of the rocker arm to the valve operating cam, namely, follow-up ability of opening and closing operation of the engine valve is excellent.

Thus, the applicant already proposes a valve operating system of the engine in which one end portions of a first and second link arm are rotatably connected to a rocker arm, the other end portion of the first link arm is rotatably supported at an engine body, and the other end portion of the second link arm is displaced by drive means in Patent Document 2. According to the valve operating system, it is possible to make the valve operating system compact and it is also possible to ensure excellent follow-up ability to the valve operating cam by directly transmitting the power from the valve operating cam to the rocker arm.

Patent Document 1:
Japanese Patent Application Laid-open No. 8-74534
Patent Document 2:
Japanese Patent Application Laid-open No. 2004-36560

DISCLOSURE OF THE INVENTION

Problems to be Solved by the Invention

The load acting on the second link arm is larger than the load acting on the first link arm, but in the valve operating system described above, the first and second link arms are substantially equal in length. This relatively increases load moments acting on the second link arm. It is desired to reduce the moments in order to improve the reliability and durability of drive means which displaces a movable shaft.

The present invention has been made in view of the above circumstances and has an object to provide an engine valve operating system which is compact in size, ensures the followabilty of the opening/closing operation, and improves the reliability and durability of drive means.

Means for Solving the Problems

To achieve the above object, according to a first aspect and feature of the present invention, there is proposed an engine valve operating system, comprising:

a rocker arm which has a cam-abutting portion to abut a valve operating cam and whose first end is coupled in operative association with an engine valve;

a link mechanism equipped with a first link arm which has a first connecting portion at a first end to be turnably connected to the rocker arm and has a fixed support portion at the second end to be turnably supported at a fixed position on an engine body as well as with a second link arm which has a second connecting portion at a first end to be turnably connected to the rocker arm and has a movable support portion at the second end to be turnably supported by a movable shaft which is displaceable; and drive means connected to the movable shaft, being capable of displacing the movable shaft in order to vary a lift amount of the engine valve continuously, characterized in that the first and second connecting portions are arranged in parallel and relatively turnably connected to the second end of the rocker arm and the movable support portion of the second link arm is placed nearer to the engine valve than the fixed support portion of the first link arm.

According to a second aspect of the present invention, in addition to the first aspect, a housing portion capable of housing the movable support portion is formed in the first link arm in such a way that a straight line linking the first connecting portions of the first link arm with the flank of the fixed support portion on the side of the second link arm overlap with part of the movable support portion as viewed laterally when at least the movable support portion is placed at the closest point to the first link arm.

According to a third aspect of the present invention, in addition to the second aspect, the first link arm is formed into a substantial U shape with a pair of first connecting portions which sandwiches the rocker arm from both sides, the fixed support portion, and a pair of arm portions which link the first connecting portions and the fixed support portion; and at least part of the housing portion is formed between the two arm portions.

According to a fourth aspect of the present invention, in addition to the second or third aspect, the housing portion can house at least part of the movable shaft.

According to a fifth aspect of the present invention, in addition to the first aspect, the rocker arm is equipped at the first end with a pair of bolt mounting portions into which adjustment bolts are screwed, the adjustment bolts having adjustable advance/retract positions and abutting a pair of engine valves, respectively; and on the rocker arm, a rib is installed between the bolt mounting portions and sticks out from the first end of the rocker arm to the cam-abutting portion.

According to a sixth aspect of the present invention, in addition to the fifth aspect, the first link arm is formed into a substantial U shape with a pair of connecting portions which sandwiches the rocker arm from the opposite sides, the fixed support portion turnably supported at a fixed position on the engine body, and a pair of arm portions which link the connecting portions and the fixed support portion; and the second link arm is formed into a flat shape so as to be placed between the two arm portions as viewed orthogonally to a straight line which links rotational axes at opposite ends of the first link arm.

According to a seventh aspect of the present invention, in addition to the fifth or sixth aspect, the first end of the first link arm is turnably connected to the rocker arm via a pin; a roller serving as the cam-abutting portion is supported via the pin; and an outer flank of that part of the rocker arm which opposes a camshaft equipped with the valve operating cam overlaps with an outer flank of the first end of the first link arm as viewed laterally, forming an arc shape around the axis of the pin.

According to an eighth aspect of the present invention, in addition to the fifth or sixth aspect, the engine valve operating system comprises a crank member on opposite ends of a connection plate, where the movable shaft and a spindle whose axis is parallel to the movable shaft stick out from the crank member, wherein the spindle is turnably supported on the engine body.

According to a ninth aspect of the present invention, in addition to the first aspect, the link mechanisms for the respective rocker arms for respective intake valves which are the engine valves have geometries different from each other.

According to a tenth aspect of the present invention, in addition to the ninth aspect, a movable shaft which supports movable support portions of second link arms of the respective link mechanisms is installed on a common crank member turnably supported on the engine body.

According to an eleventh aspect of the present invention, in addition to the first aspect, a cam holder with a bearing hole which receives and turnably supports a journal portion of a camshaft on which the valve operating cam is mounted is installed on the engine body; a supply hole whose inner end is communicated with an oil path provided in the camshaft to supply lubricant externally is installed in the journal portion in such a way as to open an outer end of the supply hole to outer periphery of the journal portion; a receiving groove corresponding to the outer end of the supply hole is provided in at least part of inner periphery of the bearing hole; a communicating channel is provided in the cam holder, linking an oil jet with the receiving groove, where the oil jet is placed in opposing relation to particular parts out of the engine valve, rocker arm, and link mechanism; and the location and shape of the receiving groove are determined such that the receiving groove is communicated with the outer end of the supply hole within a particular rotational angle range of the camshaft.

According to a twelfth aspect of the present invention, in addition to the first aspect, an oil sump is installed in an upper part of the fixed support portion of the first link arm placed above the second link arm, the oil sump bordering on the outer circumference of a rocker arm shaft which penetrates the fixed support portion so as to turnably support the fixed support portion; an oil path which allows lubricant to be supplied externally is installed in a camholder installed on the engine body so as to turnably support a journal portion of a camshaft on which the valve operating cam is mounted; and an oil supply pipe which drops lubricant into the oil sump from above is installed in a protruding condition so as to be communicated with the oil path.

Effect of the Invention

With the arrangement of the first aspect, the lift amount of the engine valve can be varied continuously by displacing the movable shaft continuously and the first ends of the first and second link arms are turnably connected directly to the rocker arm. This decreases the space for placing the link arms, thereby reducing the size of the valve operating system, and ensures that the rocker arm follows the valve operating cam properly since power from the valve operating cam is directly delivered to the cam-abutting portion of the rocker arm. Furthermore, since the movable support portion at the second end of the second link arm is placed nearer to the engine valve than the fixed support portion at the second end of the first link arm, moments of a reaction force applied to the drive means by the second link arm can be kept to a relatively small value using the principle of leverage, making it possible to reduce the load placed on the drive means, and thus contribute to improving the reliability and durability of drive means.

With the arrangement of the second aspect, since the movable support portion at the second end of the second link arm is housed in the housing portion of the first link arm when it approaches at least the first link arm, it is possible to reduce the size of the valve operating system by bringing the first and second link arms close to each other while allowing the variable lift amounts of the engine valves to be increased by setting the amount of displacement of the movable support portion at a relatively large value.

With the arrangement of the third aspect, it is possible to bring the first and second link arms closer to each other while reducing the weight and size of the first link arm, and thereby further reduce the size of the valve operating system.

With the arrangement of the fourth aspect, it is possible to bring the first and second link arms still closer to each other, and thereby even further reduce the size of the valve operating system.

With the arrangement of the fifth aspect, the rocker arm is equipped with a rib sticking out from the end of the rocker arm to the cam-abutting portion, thereby improving the rigidity of the rocker arm.

With the arrangement of the sixth aspect, by slimming down the center portion of the first link arm, it is possible to reduce the weight of the first link arm to which a smaller load than the second link arm is applied. Also, by using a flat shape for the second link arm to which a larger load than the first link arm is applied, it is possible to reduce its weight while maintaining its rigidity.

With the arrangement of the seventh aspect, it is possible to turnably connect the first end of the first link arm to the rocker arm using a compact arrangement while avoiding interference between the rocker arm and camshaft of the first link arm.

With the arrangement of the eighth aspect, by turning the crank member on the axis of the spindle, it is possible to displace the movable shaft easily and simplify the mechanism for displacing the movable shaft by the drive means.

With the arrangement of the ninth aspect, in an engine which has a plurality of intake valves for each cylinder, it is possible to vary control characteristics of the plurality of intake valves using a single control mechanism. This makes it possible to vary the lift amounts of intake valves especially in a low valve lift region, thereby admit intake air into a combustion chamber through offset positions, and thereby give whirling motion to intake air flow in the cylinder. This is very effective in increasing combustion efficiency and reducing fuel consumption in a low-load, low-speed region of an engine with variable lift amounts of the intake valve.

With the arrangement of the tenth aspect, it is possible to reduce the size of the valve operating system to move the second link arms of a plurality of the. link mechanisms using the common crank member.

With the arrangement of the eleventh aspect, since the receiving groove is communicated with the supply hole within a particular rotational angle range of the camshaft, it is possible to control the quantity and timing of lubricant supply of the lubricant emitted from the oil jet by the rotation of the camshaft, and thereby supply an appropriate quantity of lubricant to particular parts of the valve operating system.

With the arrangement of the twelfth aspect, since the lubricant supplied from the oil path to the oil supply pipe is dropped into the oil sump, the lubricant can be supplied reliably to the oil sump. Moreover, since the lubricant is supplied from the oil supply pipe to the oil sump through the air, it is possible to simplify the configuration without the need to install a complicated oil supply path.

BRIEF DESCRIPTION OF THE DRAWINGS

FIG. 5 is an exploded perspective view of the variable valve lifting means. (Embodiment 1)

FIG. 6 is a view along arrow 6 in FIG. 3. (Embodiment 1)

FIG. 7A is an explanatory diagram illustrating operation of the variable valve lifting means in a high valve lift state. (Embodiment 1)

FIG. 7B is an explanatory diagram illustrating operation of the variable valve lifting means in a low valve lift state. (Embodiment 1)

FIG. 11 is a perspective view of an intake cam holder and area around the variable valve lifting means. (Embodiment 1)

FIG. 12 is an exploded perspective view of the holder and an intake camshaft with a cap removed. (Embodiment 1)

EXPLANATION OF REFERENCE NUMERALS AND SYMBOLS

Figure 1:
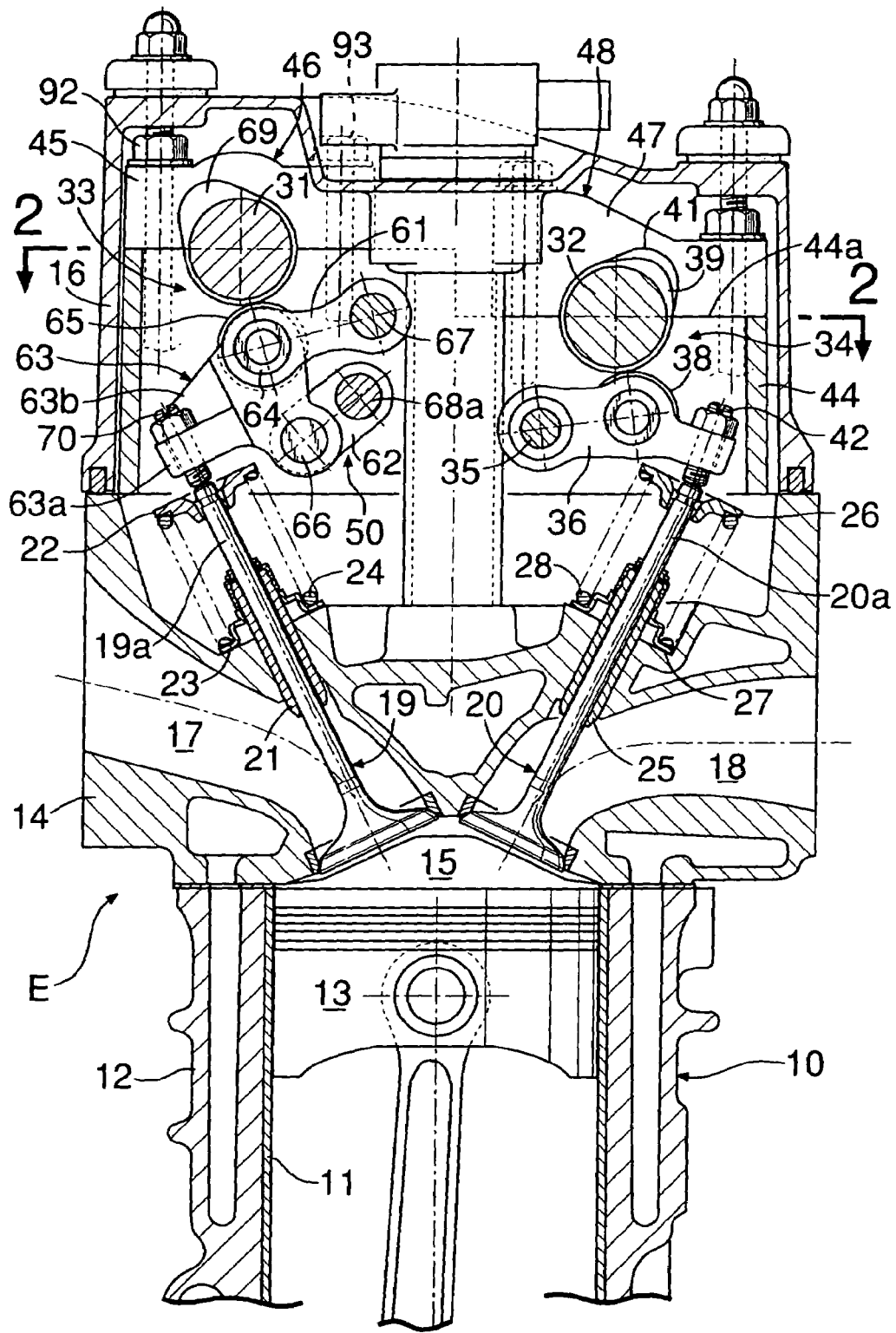
FIG. 1 is a partial longitudinal sectional view of an engine taken along line 1-1 in FIG. 2. (Embodiment 1)

10 engine body
19 intake valve which is an engine valve
31 intake camshaft
31*a* journal portion
46 cam holder
50, 50A, 50B link mechanism
60 housing portion
61 first link arm
61*a* first connecting portion
61*b* fixed support portion
61*c* arm portion
62, 62A, 62B second link arm
62*a*, 62Aa, 62Ba second connecting portion
62*b*, 62Ab, 62Bb movable support portion
63, 63A, 63*b* rocker arm
63*a* bolt mounting portion
63*b* rib
64 pin
65 roller as a cam-abutting portion
67 rocker arm shaft
68 crank member
68*a* movable shaft
68*b* connection plate
68*c* spindle
69 valve operating cam
70 adjustment bolt
72 actuator motor as drive means
86 bearing hole
87 oil path
88 supply hole
89 receiving groove
90 communicating channel
91 oil jet
98 oil sump
99 oil path
100 oil supply pipe
L1, L2 straight line

BEST MODE FOR CARRYING OUT THE INVENTION

Modes for carrying out the present invention will now be described by way of embodiments with reference to the accompanying drawings.

Embodiment 1

A first embodiment of the present invention will be described with reference to FIGS. 1 to 13B. First, referring to FIG. 1, an engine body 10 of an in-line multi-cylinder engine E comprises a cylinder block 12 with cylinder bores 11 in the interior, a cylinder head 14 joined to a top face of the cylinder block 12, and a head cover 16 joined to a top face of the cylinder head 14. Pistons 13 are slidably fitted in the cylinder bores 11 Combustion chambers 15 facing tops of the pistons 13 are formed between the cylinder block 12 and cylinder head 14.

The cylinder head 14 is equipped with intake ports 17 and exhaust ports 18 which can be communicated with combustion chambers 15. The intake ports 17 are opened and closed by a pair of intake valves 19, 19 which are engine valves while the exhaust ports 18 are opened and closed by a pair of exhaust valves 20, 20. Each intake valve 19 has a stem 19*a* slidably fitted in a valve guide 21 provided in the cylinder head 14, and is biased in a valve closing direction by a valve spring 24 installed between a spring seat 22 provided at the upper end of the stem 19a and a spring seat 23 abutted by the cylinder head 14. Each exhaust valve 20 has a stem 20a slidably fitted in a valve guide 25 provided in the cylinder head 14 and is biased in a valve closing direction by a valve spring 28 installed between a spring seat 26 provided at the upper end of the stem 20a and a spring seat 27 abutted by the cylinder head 14.

Figure 2:
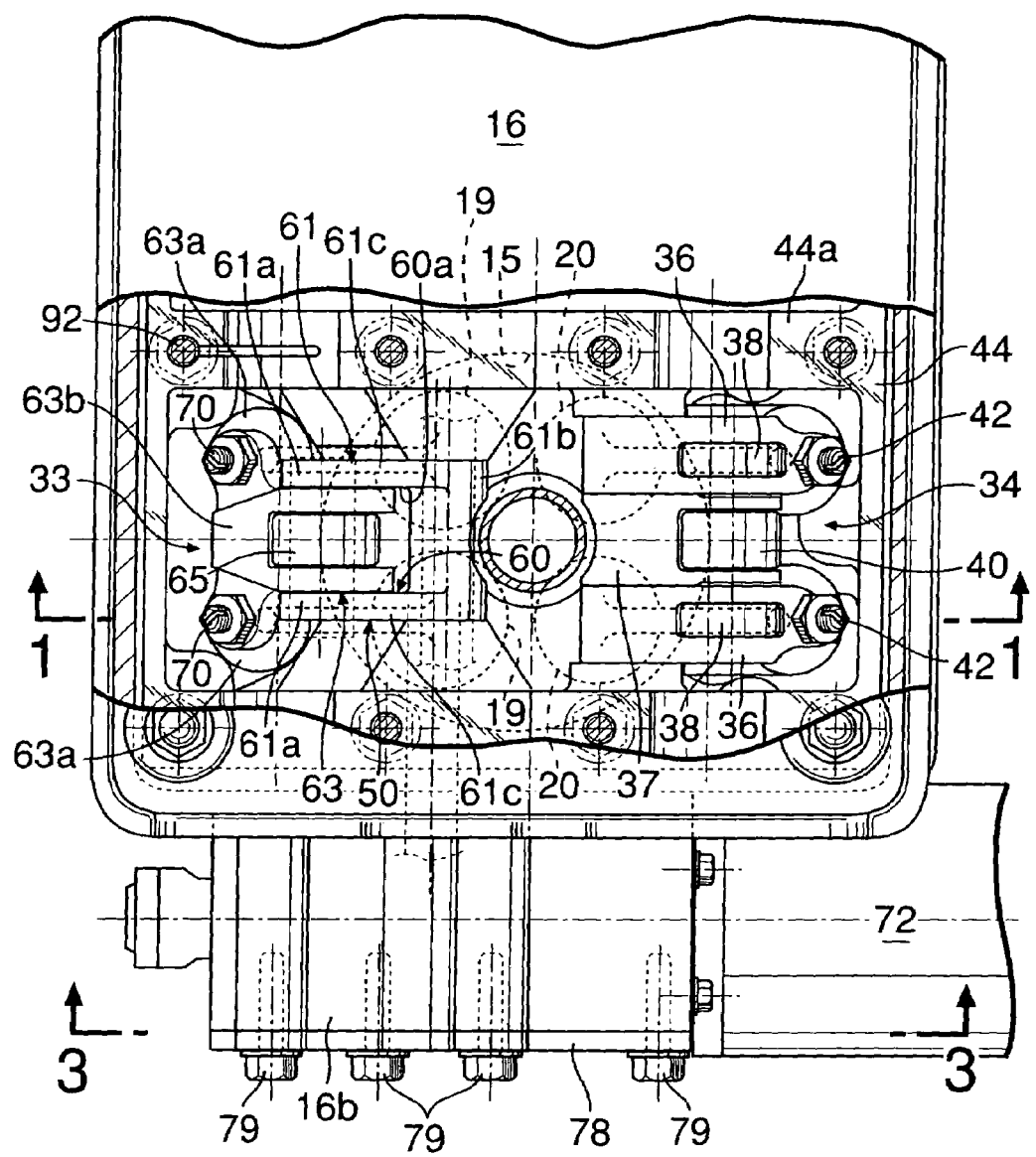
FIG. 2 is a sectional view taken along line 2-2 in FIG. 1. (Embodiment 1)

Referring also to FIG. 2, the cylinder head 14 integrally comprises a holder 44 which has supporting walls 44a placed on both sides of each cylinder. Caps 45 and 47 are fastened tightly to each supporting wall 44a to form an intake cam holder 46 and exhaust cam holder 48 in conjunction. Consequently, an intake camshaft 31 is rotatably supported by the intake cam holders 46 while an exhaust camshaft 32 is rotatably supported by the exhaust cam holders 48. The intake valves 19 are driven by the intake camshaft 31 via variable valve lifting means 33 and the exhaust valves 20 are driven by the exhaust camshaft 32 via variable valve timing/lifting means 34.

The variable valve timing/lifting means 34 which drives the exhaust valves 20 is well-known, and will only be outlined here. A pair of low-speed rocker arms 36, 36 and one high-speed rocker arm 37 are pivotably supported at their first ends on an exhaust rocker arm shaft 35 supported by the holder 44. Rollers 38 axially supported in intermediate parts of the low-speed rocker arms 36, 36 are abutted by two low speed cams 39, 39 mounted on the exhaust camshaft 32 while a roller 40 axially supported in an intermediate part of the high-speed rocker arm 37 is abutted by a high-speed cam 41 mounted on the exhaust camshaft 32. Adjustment bolts 42 which abut stem ends 20a of the exhaust valves 20 are screwed into the second ends of the low speed rocker arms 36 in such a way as to allow their advance/retract position to be adjusted.

The low speed rocker arms 36, 36 and the high speed rocker arm 37 can be connected and disconnected by hydraulic control. When the engine E is running at low speed, if the low speed rocker arms 36, 36 and the high speed rocker arm 37 are disconnected, the low speed rocker arms 36, 36 are driven by the corresponding low speed cams 39, 39 and consequently the exhaust valves 20, 20 are opened and closed with a low valve lift and a low opening angle. On the other hand, when the engine E is running at high speed, if the low speed rocker arms 36, 36 and the high speed rocker arm 37 are connected, the high speed rocker arm 37 is driven by the corresponding high speed cam 41 and consequently the exhaust valves 20, 20 are opened and closed with a high valve lift and a high opening angle by the low speed rocker arms 36, 36 coupled to the high speed rocker arm 37. In this way, the valve lift and valve timing of the exhaust valves 20, 20 are controlled at two levels by the variable valve timing/lifting means 34.

Now, the structure of the variable valve lifting means 33 will be described by referring also to FIG. 3 to FIG. 6. The variable valve lifting means 33 comprises a rocker arm 63 and link mechanism 50. The link mechanism 50 includes a first link arm 61 and a second link arm 62 placed below the first link arm 61.

The first link arm 61 is formed into a substantial U shape with a pair of first connecting portions 61a, 61a which sandwiches the rocker arm 63 from both sides, a cylindrical fixed support portion 61b, and a pair of arm portions 61c, 61c which link the first connecting portions 61a, 61a and the fixed support portion 61b.

The rocker arm 63 is equipped at a first end with a pair of bolt mounting portions 63a, 63a into which adjustment bolts 70, 70 are screwed, where the adjustment bolts have adjustable advance/retract positions and abut the upper ends of the stems 19a of the pair of intake valves 19 from above. The second end of the rocker arm 63 is formed into an approximate U shape, opening toward the intake camshaft 31. A roller 65 serving as a cam-abutting portion placed in rolling contact with a valve operating cam 69 mounted on the intake camshaft 31 is axially supported by the second end of the rocker arm 34 via an upper pin 64.

Besides, in an upper part of the rocker arm 34, a rib 63b is installed between the bolt mounting portions 63a, 63a and sticks out from the first end of the rocker arm 34 to the second end of the rocker arm 34 where the roller 65 is placed.

The first connecting portions 61a, 61a at a first end of the first link arm 61 are turnably connected to the second end of the rocker arm 63 via the upper pin 64. An outer flank of that part of the second ends of the rocker arm 63 which opposes the intake camshaft 31 overlaps with outer flanks of the first connecting portions 61a, 61a at the first end of the first link arm 61 as viewed laterally, forming an arc shape around the axis of the upper pin 64.

The second link arm 62 is placed below the first link arm 61, forming a flat shape between the arm portions 61c, 61c of the first link arm 61 as viewed orthogonally to a straight line L1 which links rotational axes at opposite ends of the first link arm 61.

The second link arm 62 is equipped at a first end with a second connecting portion 62a turnably connected to the second end of the rocker arm 63 via a lower pin 66 below the upper pin 64. The first end of the rocker arm 63 is coupled to the pair of intake valves 19, and the valve operating cam 69 in abutment with the roller 65 is installed in an upper part the second end of the rocker arm 63. Also, the first connecting portions 61a, 61a on the first end of the first link arm 61 and second connecting portion 62a at the first end of the second link arm 62 located below the first link arm 61 are vertically arranged in parallel and relatively turnably connected to the second end of the rocker arm 63.

The fixed support portion 61b on the second end of the first link arm 61 is turnably supported by a rocker arm shaft 67 fixed to the holder 44 installed on the engine body 10. A movable support portion 62b mounted on the second end of the second link arm 62 is turnably supported by a movable shaft 68a. Besides, the second link arm 62 is shorter than the first link arm 61 and the movable support portion 62b on the second end of the second link arm 62 is located closer to the intake valves 19 than the fixed support portion 61b on the second end of the first link arm 61.

The movable shaft 68a is installed on a crank member 68, which has the movable shaft 68a and a spindle 68c mounted on opposite ends of a connection plate 68b at right angles to the connection plate 68b and protruding in mutually opposite directions, where the connection plate 68b is placed in a plane parallel to a working plane of the second link arm 62. The spindle 68c is rotatably supported in a support hole 16a provided in the head cover 16 of the engine body 10.

Figure 4:
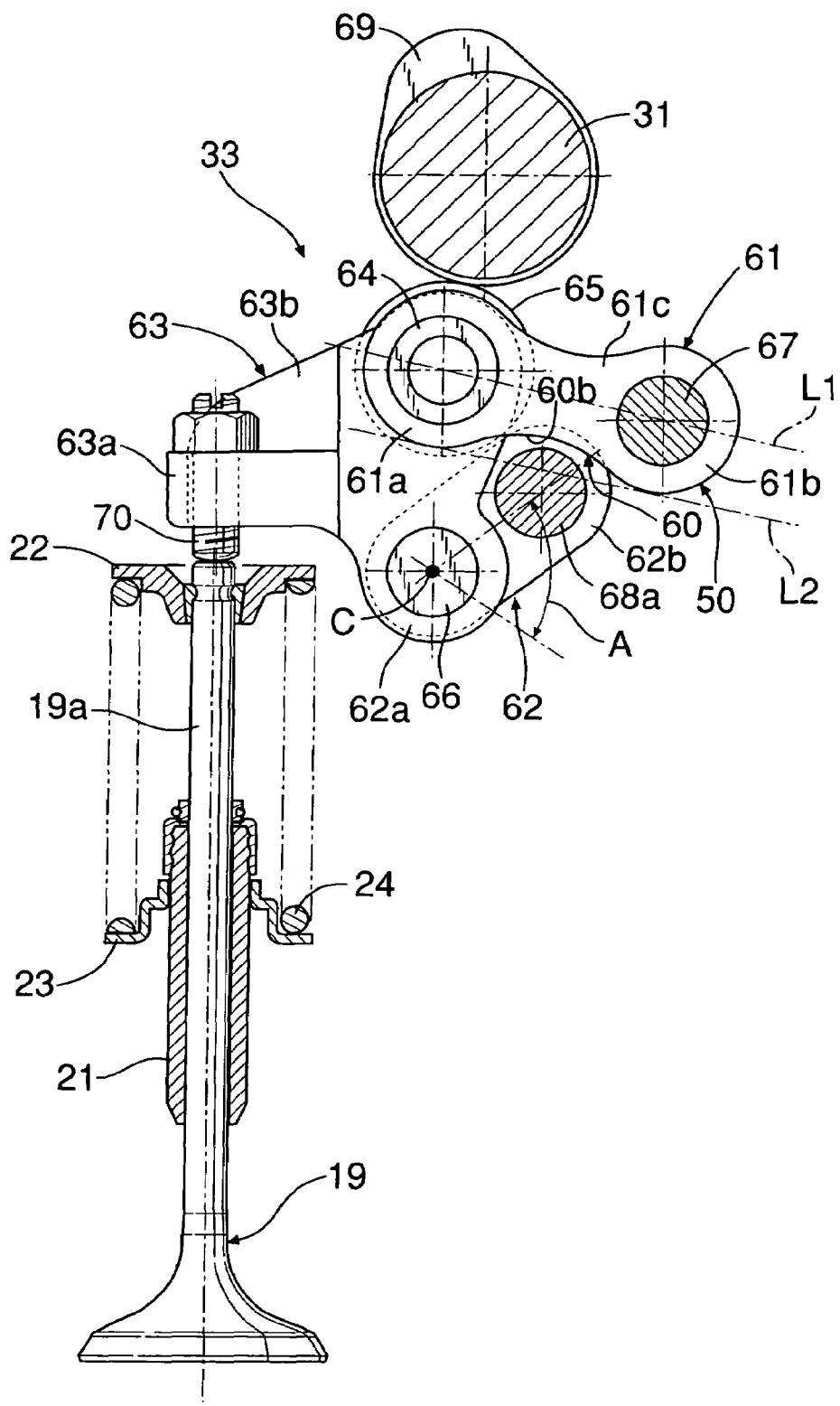
FIG. 4 is a longitudinal sectional view of variable valve lifting means. (Embodiment 1)

When the rocker arm 63 is at the raised position shown in FIG. 4, that is, when the intake valves 19 are in a closed state, the spindle 68c of the crank member 68 is placed coaxially with an axis C of the lower pin 66, which pivotably supports the lower part of the rocker arm 63 (see FIG. 5). Therefore, when the crank member 68 swings around the axis of the spindle 68c, the movable support shaft 68a moves on an arc A (see FIG. 4) which has its center at the spindle 68c.

Incidentally, a housing portion 60 capable of housing the movable support portion 62b is formed in the first link arm 61 in such a way that a straight line L2 linking the first connecting portions 61a, 61a of the first link arm 61 with the flank of the fixed support portion 61b on the side of the second link arm 62 will overlap with part of the movable support portion 62b as viewed laterally when at least the movable support portion 62b on the second end of the second link arm 62 is placed at the closest point to the first link arm 61.

The housing portion 60 comprises an orifice 60a (see FIG. 2) formed between the arm portions 61c, 61c of the first link arm 61 and capable of housing part of the movable support portion 62b, and recesses 60b, 60b formed in lower parts of the arm portions 61c, 61c and capable of housing at least part of the movable support shaft 68a. The first link arm 61 is gourd-shaped, as viewed laterally, so as to form the recesses 60b.

The spindle 68c of the crank member 68 sticks out from the support hole 16a in the head cover 16. A control arm 71 is fixed to the tip of the spindle 68c and driven by an actuator motor 72 mounted on an outer wall of the cylinder head 14 and serving as drive means. That is, a nut member 74 meshes with a threaded shaft 73 rotated by the actuator motor 72, a first end of a connecting link 76 is pivotably supported on the nut member 74 via a pin 75, and the second end is connected to the control arm 71 via pins 77, 77. Therefore, when the actuator motor 72 is operated, the nut member 74 moves along the rotating threaded shaft 73, the crank member 68 is caused to swing around the spindle 68c by the control arm 71 connected to the nut member 74 via the connecting link 76, and consequently the movable support shaft 68a moves between the position shown in FIG. 7A and the position shown in FIG. 7B.

A rotational angle sensor 80 such as a rotary encoder is installed on an outer wall surface of the head cover 16 with a first end of a sensor arm 81 fixed to the tip of a sensor shaft 80a. A guide groove 82 is provided in the control arm 71 linearly extending along its length, and a pin 83 mounted on the second end of the sensor arm 81 is slidably fitted in the guide groove 82.

The threaded shaft 73, nut member 74, pin 75, connecting link 76, pins 77, 77, control arm 71, rotational angle sensor 80, sensor arm 81, and pin 83 are housed within wall portions 14a and 16b sticking out from flanks of the cylinder block 14 and head cover 16. A cover 78 which covers end faces of the wall portions 14a and 16b is fixed to the wall portions 14a and 16b with bolts 79.

Figure 3:
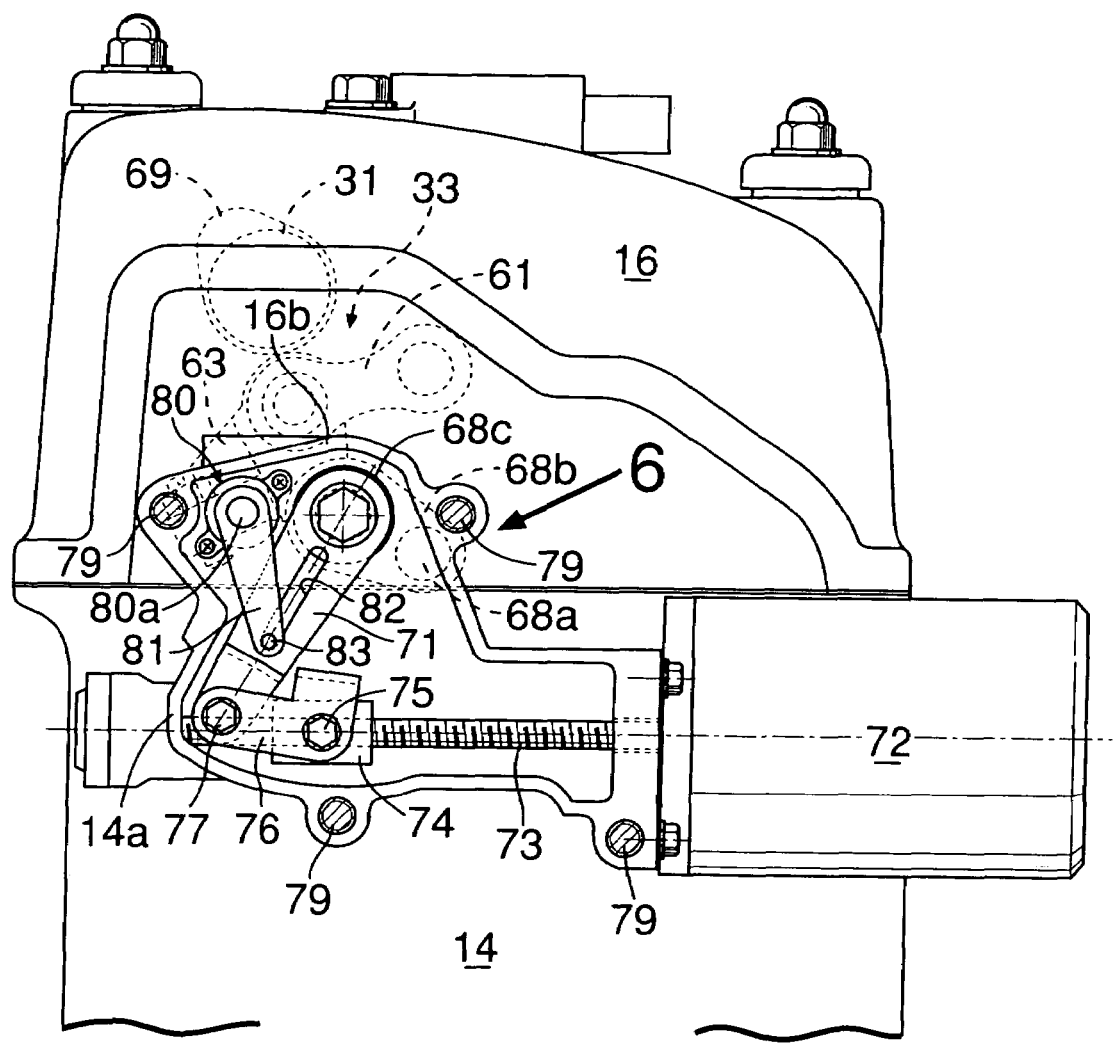
FIG. 3 is a view taken along line 3-3 in FIG. 2. (Embodiment 1)

In the variable valve lifting means 33, when the control arm 71 is turned counterclockwise by the actuator motor 72 from the position indicated by the solid line in FIG. 3, the crank member 68 (see FIG. 5) connected to the control arm 71 turns counterclockwise and the movable support shaft 68a of the crank member ascends as shown in FIG. 7A. When the valve operating cam 69 mounted on the intake camshaft 31 pushes the roller 65 in this state, a four-bar link joining the rocker shaft 67, upper pin 64, lower pin 68, and movable support shaft 68a deforms, causing the rocker arm 63 to swing downward from the chain-line position to the solid-line position, causing the adjustment bolts 70, 70 to push the stems 19a of the intake valves 19, and thereby opening the intake valves 19 with a high valve lift.

When the control arm 71 is turned to the solid-line position in FIG. 3 by the actuator motor 72, the crank member 68 connected to the control arm 71 turns clockwise and the movable support shaft 68a of the crank member 68 descends as shown in FIG. 7B. When the valve operating cam 69 mounted on the intake camshaft 31 pushes the roller 65 in this state, the four-bar link deforms, causing the rocker arm 63 to swing downward from the chain-line position to the solid-line position, causing the adjustment bolts 70, 70 to push the stems 19a of the intake valves 19, and thereby opening the intake valves 19 with a low valve lift.

Figure 8:
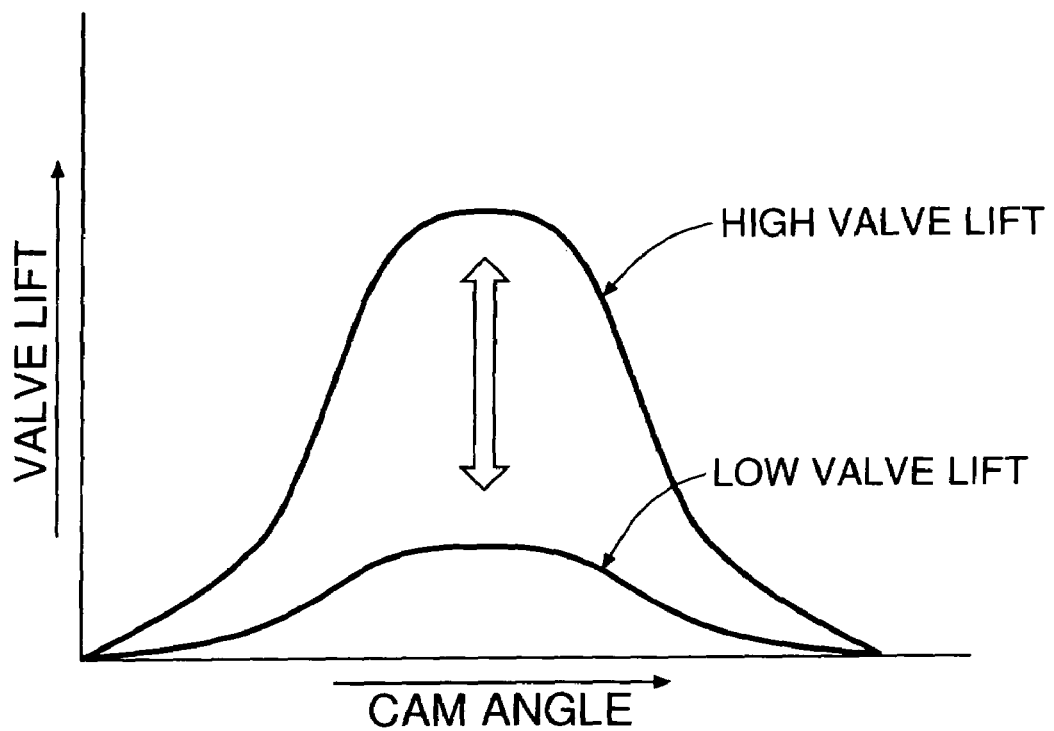
FIG. 8 is a diagram showing a valve lift curve of an intake valve. (Embodiment 1)

FIG. 8 is a diagram showing a valve lift curve of the intake valve 19. The opening angle with the high valve lift corresponding to FIG. 7A is the same as the opening angle with the low valve lift corresponding to FIG. 7B, and only the amount of valve lift has changed. In this way, the variable valve lifting means 33 allows only the valve lift to be changed freely without changing the opening angle of the intake valves 19.

When changing the valve lift of the intake valves 19 by swinging the crank member 68 using the actuator motor 72, it is necessary to detect the magnitude of the valve lift, i.e., the rotational angle of the spindle 68c of the crank member 68, and feed it back for use in controlling the actuator motor 72. For that reason, the rotational angle of the spindle 68c of the crank member 68 is detected by the rotational angle sensor 80. To simply detect the rotational angle of the spindle 68c of the crank member 68, the rotational angle sensor 80 can be connected directly to the spindle 68c. However, since the intake efficiency changes greatly with only a slight change in the amount of valve lift in the low valve lift region, it is necessary to detect the rotational angle of the spindle 68c of the crank member 68 accurately and feed it back for use in controlling the actuator motor 72. On the other hand, in the high valve lift region, since the intake efficiency does not change greatly even when the amount of valve lift changes to some extent, high accuracy is not required to detect the rotational angle.

Figure 9:
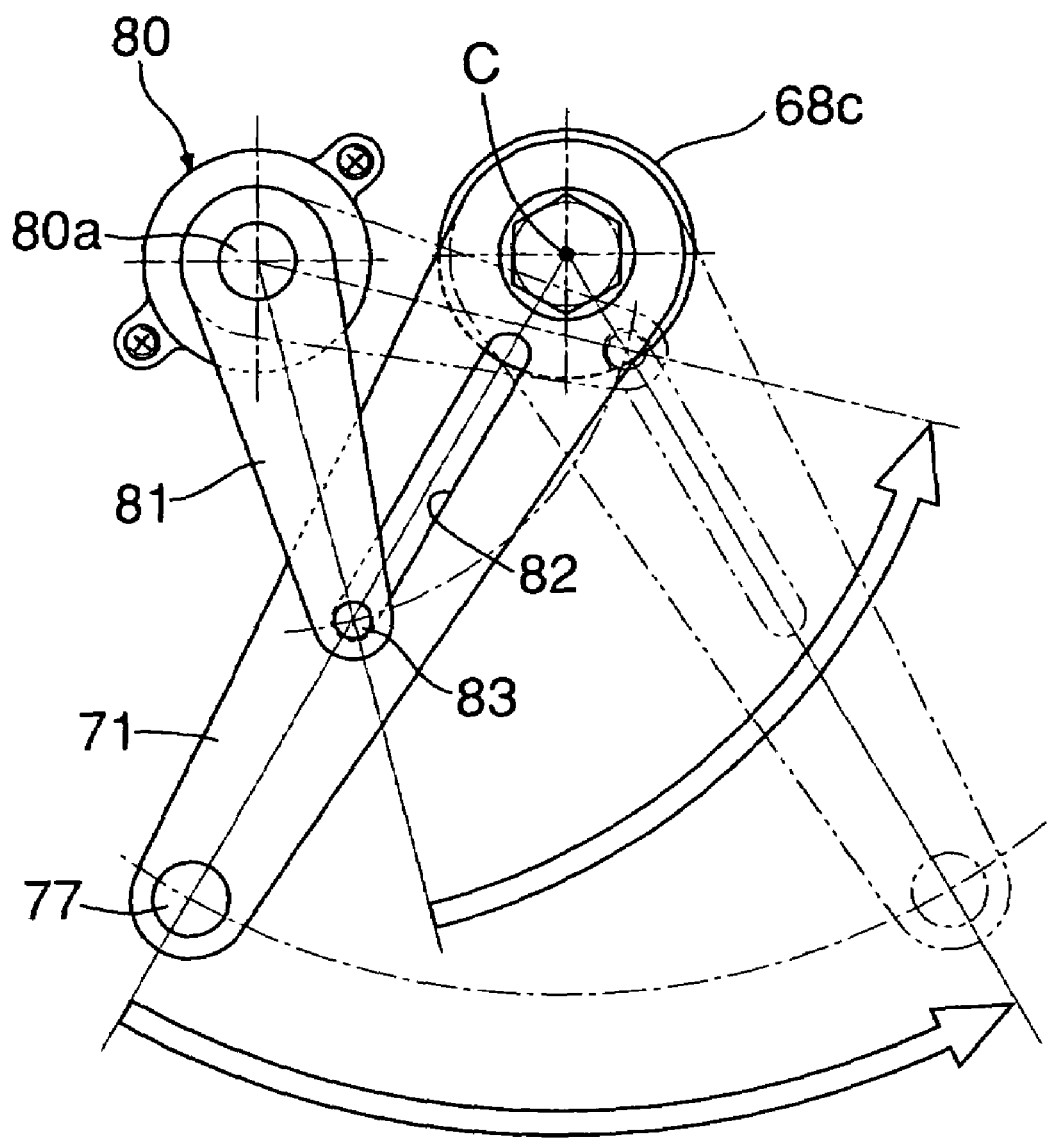
FIG. 9 is an enlarged view of essential part of FIG. 3. (Embodiment 1)

The position of the control arm 71 indicated by the solid line in FIG. 9 corresponds to the low valve lift region and the position of the control arm 71 indicated by the chain line in the anticlockwise direction away from the low valve lift region corresponds to the high valve lift position. In the low valve lift region, since the pin 83 of the sensor arm 81 fixed to the sensor shaft 80a of the rotational angle sensor 80 is engaged with the tip side (the side farther from the axis C) of the guide groove 82 of the control arm 71, even a slight swing of the control arm 71 results in a large swing of the sensor arm 81. This magnifies the ratio of the rotational angle of the sensor shaft 80a relative to the rotational angle of the crank member 68, enhancing the resolution of the rotational angle sensor 80, and thus making it possible to detect the rotational angle of the crank member 68 with high accuracy.

On the other hand, in the high valve lift region where the control arm 71 has swung to the position indicated by the chain line, since the pin 83 of the sensor arm 81 fixed to the sensor shaft 80a of the rotational angle sensor 80 is engaged with the base side (the side closer to the axis C) of the guide groove 82 of the control arm 71, even a large swing of the control arm 71 results in a slight swing of the sensor arm 81. This reduces the ratio of the rotational angle of the sensor shaft 80a relative to the rotational angle of the crank member 68, decreasing the detection accuracy of the rotational angle of the crank member 68 compared to when the valve lift is low.

Figure 10:
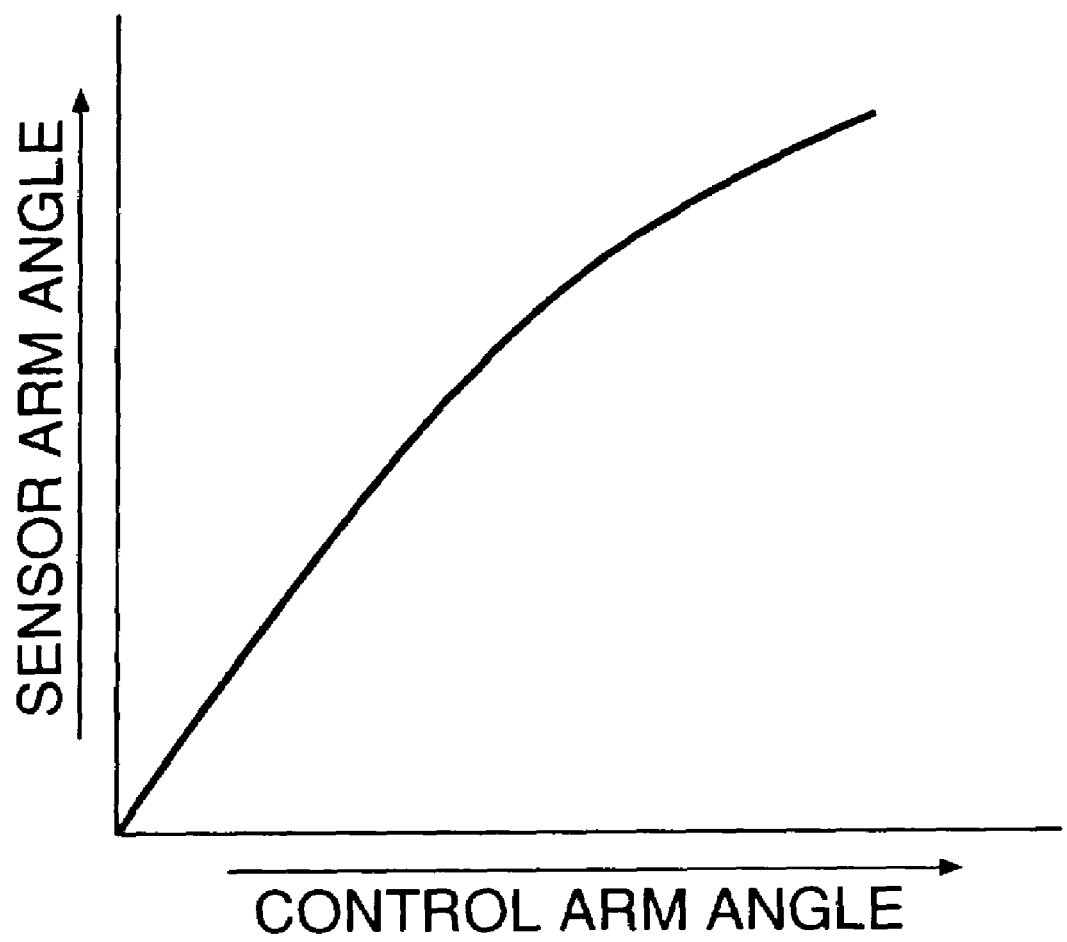
FIG. 10 is a graph showing relationship between the rotational angle of a control arm and rotational angle of a sensor arm. (Embodiment 1)

As is clear from FIG. 10, when the rotational angle of the control arm 71 increases from a low valve lift state to a high valve lift state, the detection accuracy is high at first since the rate of increase of the angle of the sensor arm 81 is high, but the rate of increase falls gradually, resulting in low detection accuracy.

In this way, without an expensive rotational angle sensor with high detection accuracy, by designing the sensor arm 81 of the rotational angle sensor 80 to be engaged with the guide groove 82 of the control arm 71, it is possible to ensure high detection accuracy in a low valve lift state where a high detection accuracy is required, and thereby contribute to cost reduction.

In this arrangement, since one end (the end closer to the spindle 68c) of the control arm 71 and one end (the end closer to the rotational angle sensor 80) of the sensor arm 81 are placed in proximity to each other and the guide groove 82 is formed in the end of the control arm 71, the sensor arm 81 can be made compact with reduced length. Incidentally, the formation of the guide groove 82 in the end of the control arm 71 reduces the distance from the axis C, reducing the amount of travel in the circumferential direction of the guide groove 82 as well. However, the length of the sensor arm 81 is also reduced, ensuring a sufficient rotational angle for the sensor arm 81, and thereby ensuring the detection accuracy of the rotational angle of the sensor 80.

Referring to FIGS. 11 and 12, a bearing hole 86 which receives and rotatably supports a journal portion 31a of the intake camshaft 31 is formed between the supporting wall 44a of the holder 44 and cap 45 which compose each intake cam holder 46 in conjunction. Also, an oil path 87 for use to supply lubricant from an external oil supply source (not shown) is provided coaxially in the intake camshaft 31. A supply hole 88 whose inner end is communicated with the oil path 87 is installed in the journal portion 31a in such a way as to open its outer end to outer periphery of the journal portion 31a.

According to this embodiment, receiving groove 89 corresponding to the outer end of the supply hole 88 is provided in at least part of inner periphery of the bearing hole 86, namely that part of the inner periphery of the bearing hole 86 which is on the side of the holder 44. The receiving groove 89, which is formed only in part of the inner circumference of the bearing hole 86, does not adversely affect the load capacity of the bearing hole 86 to carry the load of the journal portion 31a.

On the other hand, a communicating channel 90 whose first end is communicated with the receiving groove 89 is provided in each intake cam holder 46. The cap 45 is fastened tightly to the supporting wall 44a of the holder 44 by a pair of bolts 92 and 93 placed on both sides of the intake camshaft 31. Bolt holes 94 and 95 are provided in the supporting wall 44a to receive the bolts 92 and 93 screwed into them. Thus, according to this embodiment, the communicating channel 90 is composed of a groove 96 provided in the top face of the supporting wall 44a of the holder 44 whose first end is communicated with the receiving groove 89 and a gap created between the bolt 92 and bolt hole 94. An oil jet 91 is installed on the supporting wall 44a of each intake cam holder 46, being placed in opposing relation to particular parts—the stem 19a of the intake valve 19 and an abutting portion of the adjustment bolts 70, according to this embodiment—out of the intake valve 19, rocker arm 63, and link mechanism 50 and being communicated with the communicating channel 90.

The location and shape of the receiving groove 89 are determined such that the receiving groove 89 is communicated with the outer end of the supply hole 88 within a particular rotational angle range of the intake camshaft 31. The particular rotational angle range of the intake camshaft 31, for example, is a range within which a high spot of the valve operating cam 69 comes into contact with the roller 65 of the rocker arm 63.

Figure 13A:
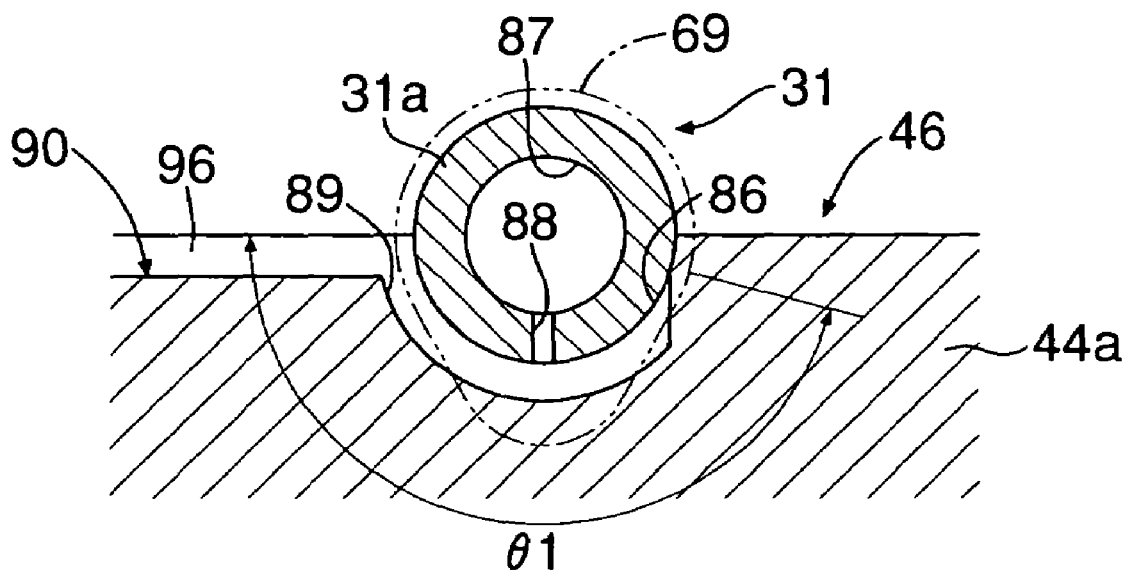
FIG. 13A is a sectional view taken along line 13-13 in FIG. 12 in the state in which a roller is in contact with a high spot of a valve operating cam. (Embodiment 1)
Figure 13B:
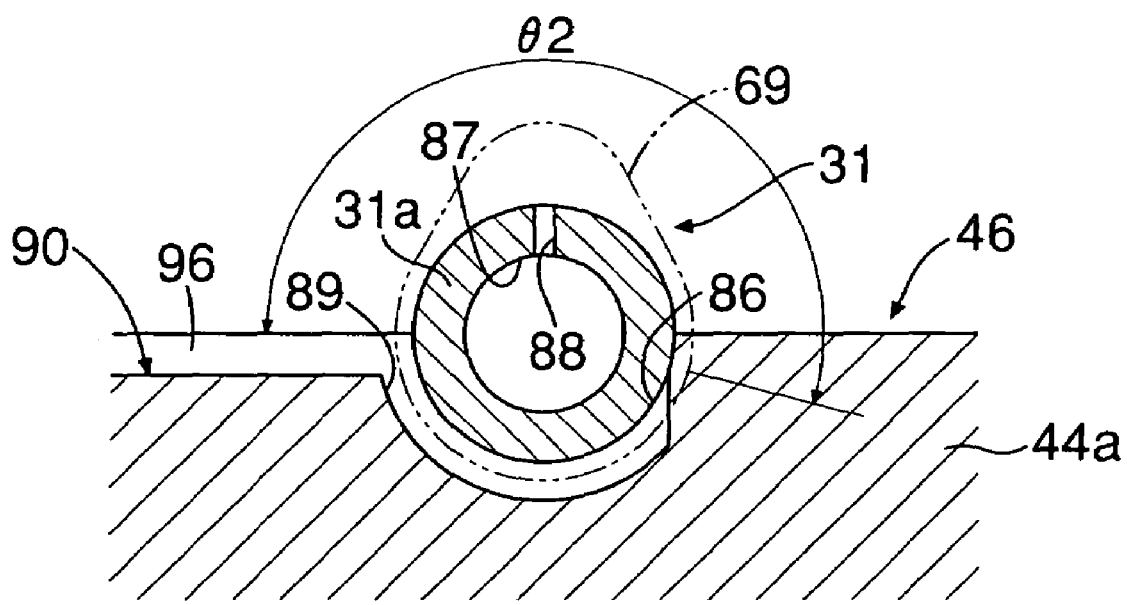
FIG. 13B is a sectional view taken along line 13-13 in FIG. 12 in the state in which a contact portion of the roller deviates from the high spot of the valve operating cam. (Embodiment 1)

Specifically, as shown in FIG. 13A, only when the rotational angle of the intake camshaft 31 is within a range of θ1 and the high spot of the valve operating cam 69 is within a range in which it comes into contact with the roller 65 of the rocker arm 63, the oil path 87 is communicated with the receiving groove 89 via the supply hole 88, allowing the lubricant to be supplied from the communicating channel 90 to the oil jet 91.

On the other hand, when the rotational angle of the intake camshaft 31 is in a range of θ2 excluding the range of θ1, the supply hole 88 is cut off from the receiving groove 89, causing the lubricant from the supply hole 88 to be used for lubrication between the journal portion 31a and bearing hole 86 instead of being supplied to the oil jet 91.

Now, operation of the first embodiment will be described. In the variable valve lifting means 33 which continuously varies the lift amounts of the intake valves 19, the first connecting portions 61a, 61a and second connecting portion 62a attached to the first ends of the first link arm 61 and second link arm 62, respectively, are arranged in parallel and relatively turnably connected to the second end of the rocker arm 63 whose first end is coupled to the pair of intake valves 19. The fixed support portion 61b on the second end of the first link arm 61 is turnably supported by the rocker arm shaft 67 of the engine body 10. The movable support portion 62b on the second end of the second link arm 62 is turnably supported by the movable support shaft 68a which is displaceable.

Thus, by varying the movable support shaft 68a continuously, it is possible to vary the lift amounts of the intake valves 19 continuously. Moreover, since the first ends of the first and second link arms 61 and 62 are turnably connected directly to the rocker arm 63, it is possible to reduce the space required for the link arms 61 and 62, and thereby reduce the size of the valve operating system. Also, since power is transmitted directly from the valve operating cam 69 to the roller 65 of the rocker arm 63, it is possible to follow the valve operating cam 69 properly. Besides, the rocker arm 63 and the first and second link arms 61 and 62 can be placed at almost the same location along the axis of the intake camshaft 31, making it possible to reduce the size of the valve operating system along the axis of the intake camshaft 31.

The rocker arm 63 is equipped at the first end with the pair of bolt mounting portions 63a, 63a into which the adjustment bolts 70, 70 are screwed, the adjustment bolts 70 having adjustable advance/retract positions and abutting the pair of intake valves 19, respectively; and on the rocker arm 63, the rib 63b is installed between the bolt mounting portions 63a, 63a and sticks out from the first end of the rocker arm 63 to the location of the roller 65. This makes it possible to improve the rigidity of the rocker arm 63.

The first link arm 61 comprises the pair of first connecting portions 61a, 61a which sandwiches the rocker arm 63 from both sides, the fixed support portion 61b, and the pair of arm portions 61c, 61c which link the first connecting portions 61a, 61a and the fixed support portion 61b. The second link arm 62 is formed into a flat shape placed between the two arm portions 61c, 61c as viewed orthgonally to the straight line L1 which links rotational axes at opposite ends of the first link arm 61. This makes it possible to reduce the weight and size of the first link arm 61 which carries lighter loads than the second link arm 62 and reduce the weight of the second link arm 62 which is subjected to heavier loads than the first link arm 61 while maintaining its rigidity.

Furthermore, the housing portion 60 capable of housing the movable support portion 62b is formed in the first link arm 61 in such a way that the straight line L2 linking the first connecting portions 61a, 61a of the first link arm 61 with the flank of the fixed support portion 61b on the side of the second link arm 62 will overlap with part of the movable support portion 62b as viewed laterally when at least the movable support portion 62b is placed at the closest point to the first link arm 61. This makes it possible to reduce the size of the valve operating system by bringing the first and second link arms 61 and 62 close to each other while allowing the variable lift amount of the intake valves 19 to be increased by relatively increasing the amount of displacement of the movable support portion 62b. Besides, since part of the housing portion 60 is formed between the two arm portions 61c, 61c, it is possible to bring the first and second link arms 61 and 62 closer to each other, thereby further reducing the size of the valve operating system. Furthermore, since the housing portion 60 can house at least part of the movable shaft 68a, it is possible to bring the first and second link arms 61 and 62 still closer to each other, and thereby even further reduce the size of the valve operating system.

The first connecting portions 61a and second connecting portion 62a on the first ends of the first and second link arms 61 and 62 are arranged vertically in parallel and relatively turnably connected to the second end of the rocker arm 63 whose first end is coupled to the pair of intake valves 19. Also, the second link arm 62 is shorter than the first link arm 61 and the movable support portion 62b on the second end of the second link arm 62 is located closer to the intake valves 19 . . . than the fixed support portion 61b on the second end of the first link arm 61. Consequently, moments of a reaction force applied to the control arm 71 by the second link arm 62 via the movable shaft 68a can be kept to a relatively small value using the principle of the lever, making it possible to reduce the loads placed on the control arm 71 and actuator motor 72, and thus contribute to improving the reliability and durability of the control arm 71 and actuator motor 72.

The first connecting portions 61a, 61a at the first end of the first link arm 61 are turnably connected to the rocker arm 63 via the upper pin 64 and the roller 65 is axially supported by the rocker arm 63 via the upper pin 64. Since the outer flank of that part of the rocker arm 63 which opposes the intake camshaft 31 overlaps with the outer flanks of the first connecting portions 61a, 61a at the first end of the first link arm 61 as viewed laterally, forming an arc shape around the axis of the upper pin 64, it is possible to turnably connect the first end of the first link arm 61 to the rocker arm 63 using a compact configuration while avoiding interference between the rocker arm 63 and intake camshaft 31 of the first link arm 61.

Also, the variable valve lifting means 33 comprises the crank member 68 on opposite ends of the connection plate 68b, where the movable shaft 68a and the spindle 68c whose axis is parallel to the movable shaft 68a stick out from the crank member 68, and the spindle 68c is turnably supported on the head cover 16 of the engine body 10. Thus, by turning the crankmember 68 on the axis of the spindle 68c, it is possible to displace the movable shaft 68a easily and simplify the mechanism for displacing the movable shaft 68a by the actuator motor 72.

Besides, the supply hole 88 whose inner end is communicated with the oil path 87 is provided in the intake camshaft 31 to supply lubricant externally. It is installed in the journal portion 31a of the intake camshaft 31 in such a way as to open its outer end to the outer periphery of the journal portion 31a. The receiving groove 89 corresponding to the outer end of the supply hole 88 is provided in at least part of the inner periphery of the bearing hole 86 of the intake cam holder 46. The communicating channel 90 is provided in each intake cam holder 46 to communicate the receiving groove 89 with the oil jet 91 which is placed in opposing relation to a particular part—the intake valve 19 and the abutting portion of the rocker arm 63, according to this embodiment—out of the intake valve 19, rocker arm 63, and link mechanism 50. The location and shape of the receiving groove 89 are determined such that the receiving groove 89 is communicated with the outer end of the supply hole 88 within a particular range $\theta 1$ of the rotational angle of the intake camshaft 31. Since the receiving groove 89 is communicated with the supply hole 88 within the particular range $\theta 1$ of the rotational angle of the intake camshaft 31, it is possible to control the quantity and timing of lubricant supply by the rotation of the intake camshaft 31, and thereby supply an appropriate quantity of lubricant to particular parts of the valve operating system.

Incidentally, although in the first embodiment, the range within which a high spot of the valve operating cam 69 comes into contact with the roller 65 of the rocker arm 63 is set to the particular rotational angle range $\theta 1$ of the intake camshaft 31, this is not restrictive and the range can be set as appropriate.

Embodiment 2

Figure 14:
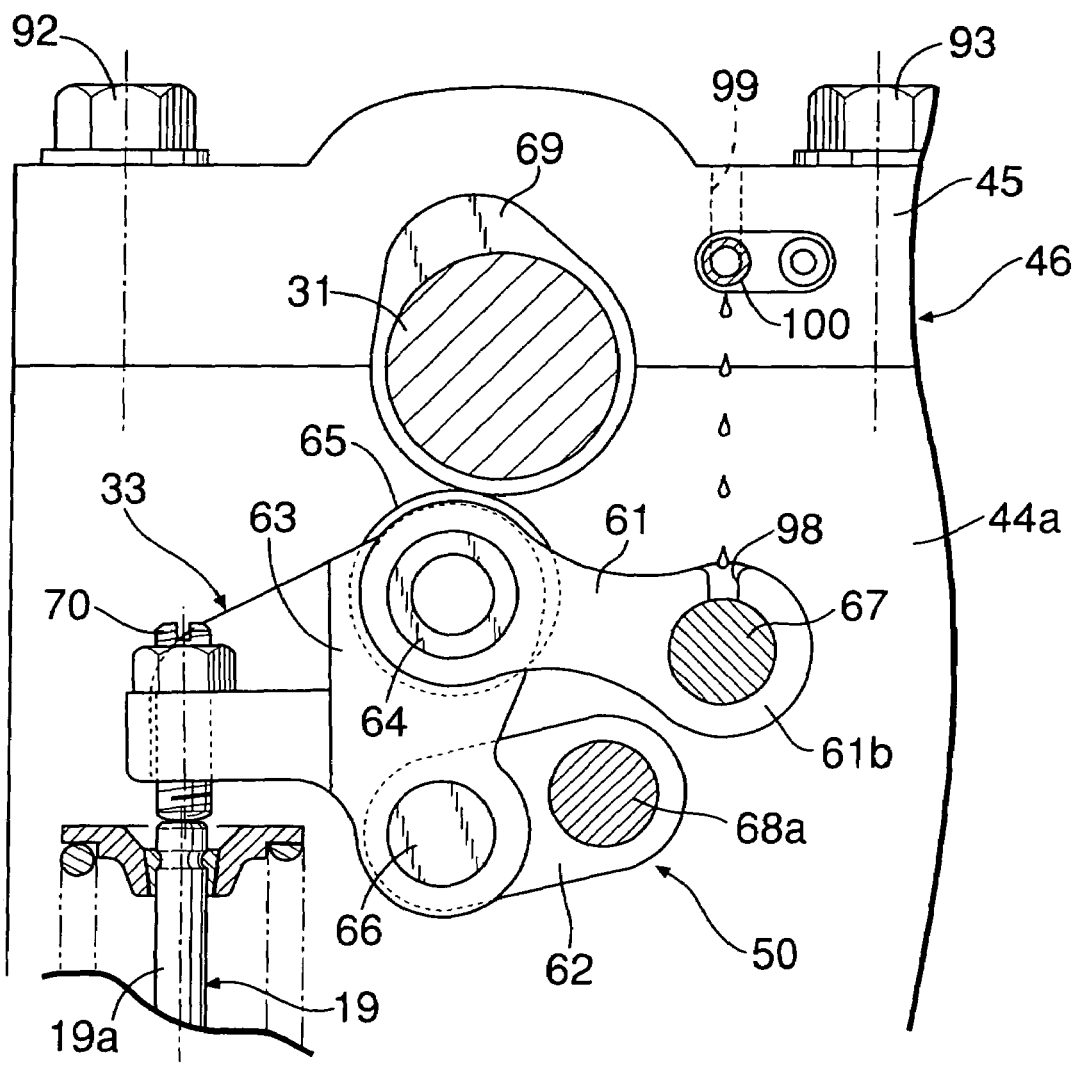
FIG. 14 is a longitudinal sectional view of an intake cam holder and area around variable valve lifting means. (Embodiment 2)
Figure 15:
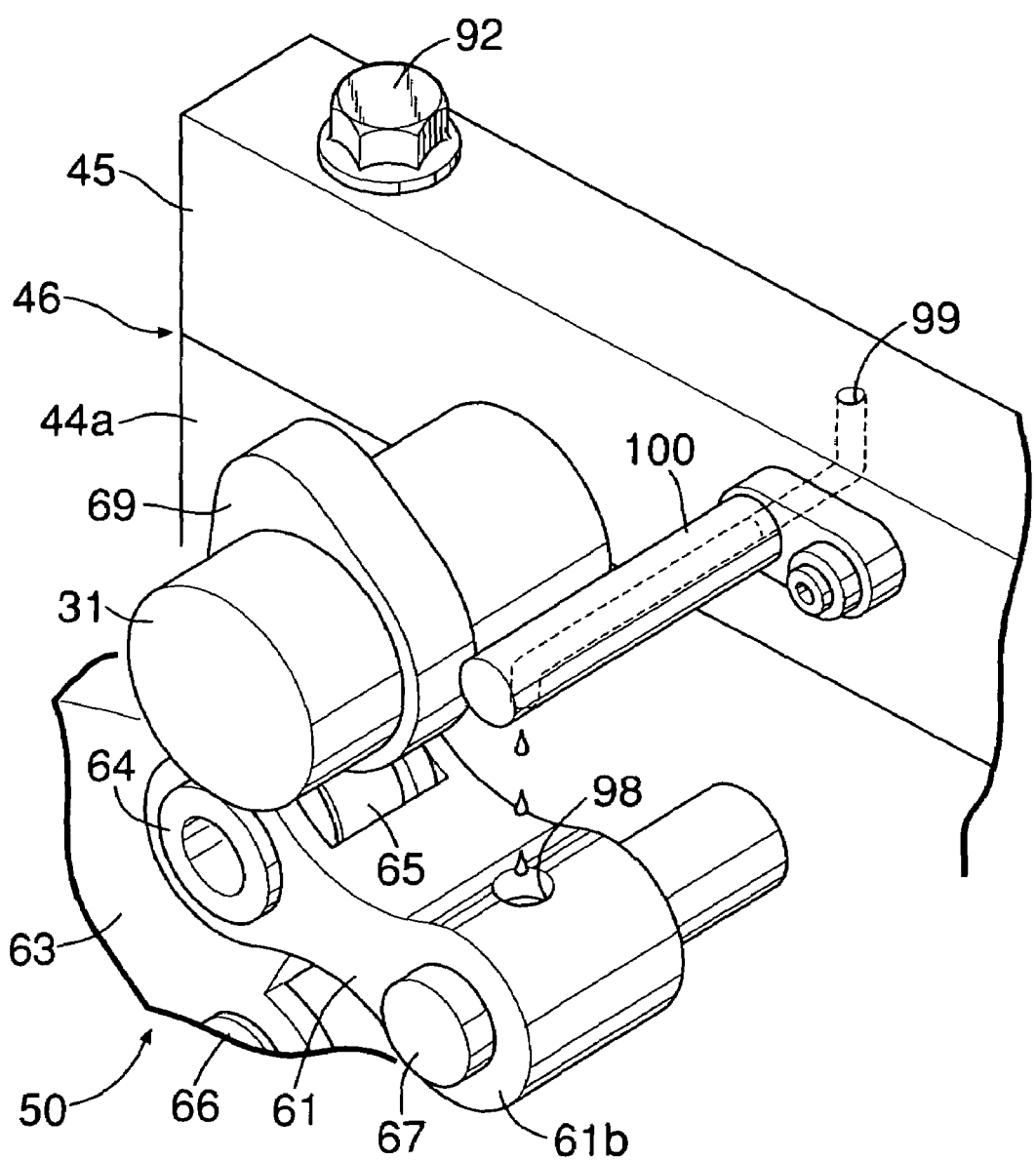
FIG. 15 is a perspective view showing part of FIG. 14. (Embodiment 2)
Figure 16:
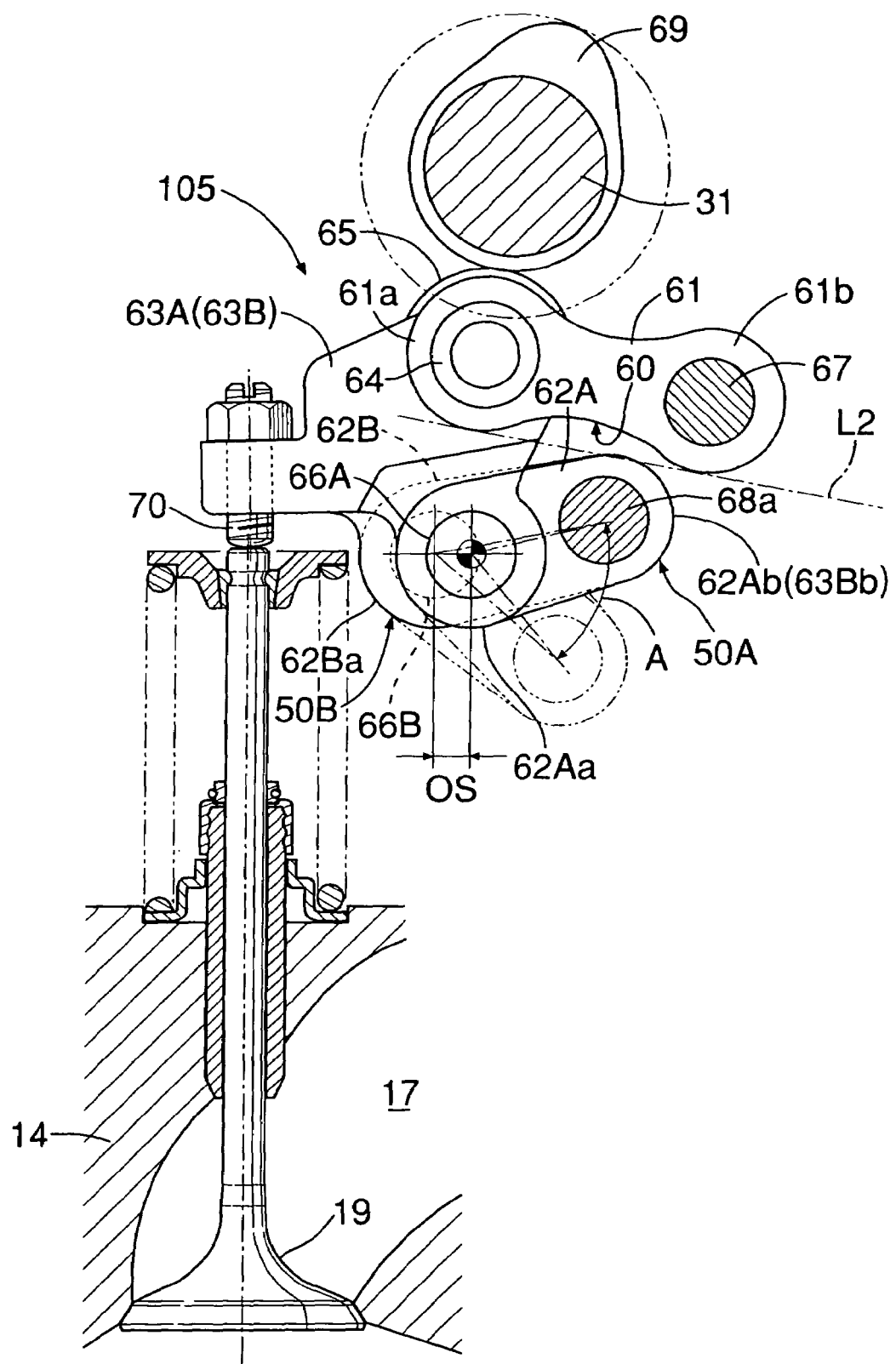
FIG. 16 is a longitudinal sectional view of variable valve lifting means. (Embodiment 3)
Figure 17:
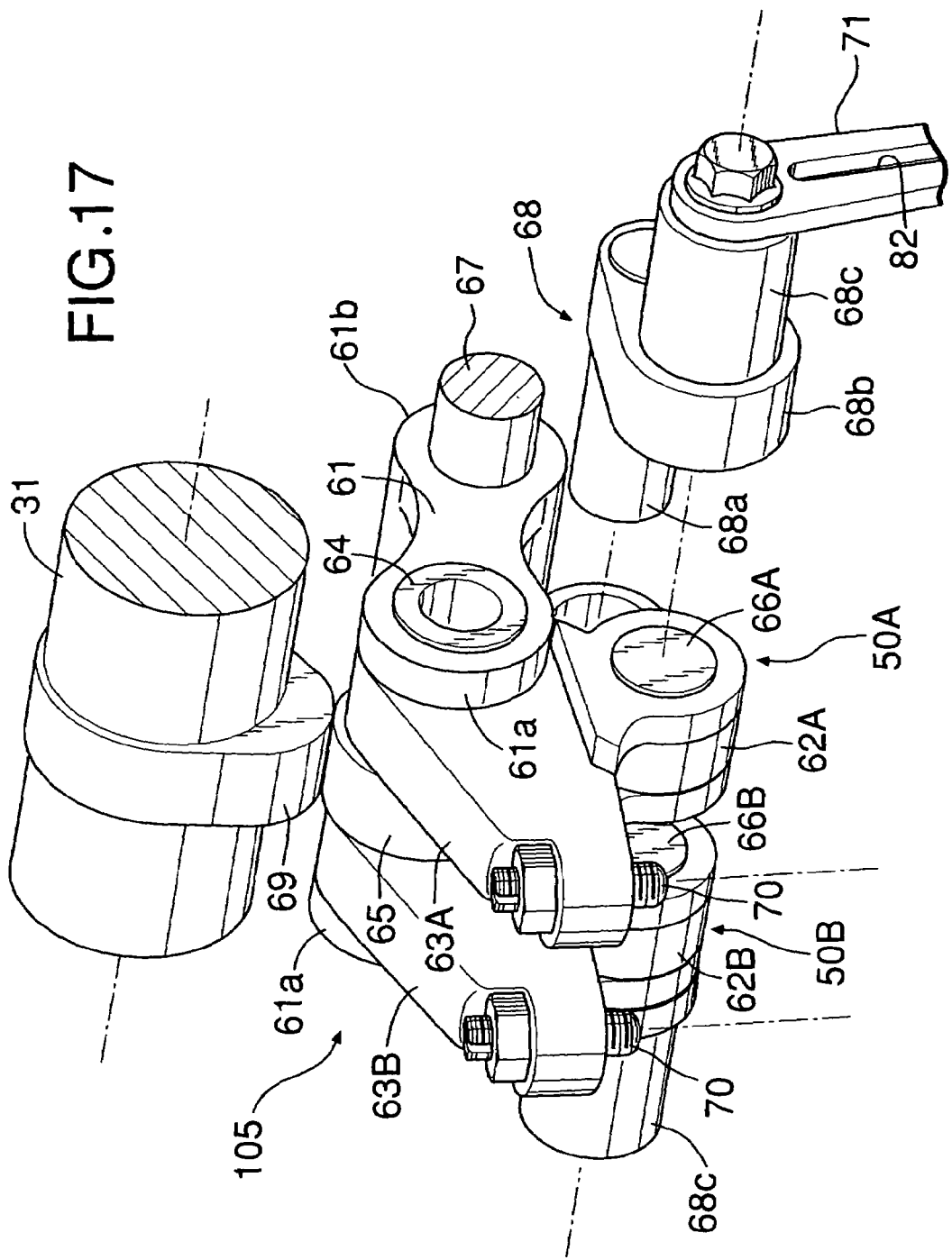
FIG. 17 is a perspective view of the variable valve lifting means. (Embodiment 3)

Next, a second embodiment of the present invention will be described with reference to FIGS. 14 to 15. An oil sump 98 is installed in an upper part of a fixed support portion 61b of a first link arm 61 placed above a second link arm 62, the oil sump 98 bordering on the outer circumference of a rocker arm shaft 67 which penetrates the fixed support portion 61b so as to turnably support the fixed support portion 61b. An oil path 99 which allows lubricant to be supplied externally is installed in a cap 45 of an intake cam holder 46 and an oil supply pipe 100 which drops lubricant into the oil sump 98 from above sticks out from the cap 45 of the intake cam holder 46 so as to be communicated with the oil path 99.

According to the second embodiment, since the lubricant supplied from the oil path 99 to the oil supply pipe 100 is dropped into the oil sump 98, the lubricant can be supplied reliably to the oil sump 98 and the lubricant collected in the oil sump 98 is used for lubrication between the rocker arm shaft 67 and first link arm 61. Moreover, since the lubricant is supplied from the oil supply pipe 100 to the oil sump 98 through the air, it is possible to simplify the configuration without the need to install a complicated oil supply path.

Incidentally, the path used to supply lubricant to the oil supply pipe 100 is not limited to the one according to the second embodiment described above. The lubricant may be supplied to the oil supply pipe 100 from an oil path 87 provided in an intake camshaft 31 through a supply hole 88 and receiving groove 89 and then through an oil path provided in an intake cam holder 46 as in the case of the first embodiment.

Embodiment 3

Now, a third embodiment of the present invention will be described with reference to FIGS. 16 to 21. First, referring to FIGS. 16 and 17, a pair of intake valves 19 are driven by an intake camshaft 31 via variable valve lifting means 105, which comprises a pair of rocker arms 63A and 63B corresponding to the respective intake valves 19 and a pair of link mechanisms 50A and 50B corresponding to the rocker arms 63A and 63B, respectively. The link mechanism 50A corresponding to the rocker arm 63A includes a first link arm 61 and second link arm 62B while the other link mechanism 50B corresponding to the rocker arm 63B includes the first link arm 61 and second link arm 62B. The first link arm 61 is common to the two link mechanisms 50A and 50B.

Adjustment bolts 70 with adjustable advance/retract positions are screwed into first ends of the two rocker arms 63A and 63B, the adjustment bolts 70 serving as valve-abutting portions which abut the upper ends of stems 19a of intake valves 19 corresponding to the respective rocker arms 63A and 63B from above. A roller 65 serving as an abutting portion placed in rolling contact with a valve operating cam 69 mounted on the intake camshaft 31 is axially supported between the second ends of the two rocker arms 63A and 63B via an upper pin 64.

The first link arm 61 is formed into a U shape with a pair of first connecting portions 61a, 61a which sandwiches the rocker arms 63A and 63B from both sides, and the first connecting portions 61a, 61a at a first end of the first link arm 61 are turnably connected to the second end of the rocker arms 63A and 63B via the upper pin 64.

A second connecting portion 62Aa mounted on a first end of the second link arm 62A placed below the first link arm 61 is turnably connected to the second end of the rocker arm 63A below the upper pin 64 via a lower pin 66A. A second connecting portion 62Ba mounted on a first end of the second link arm 62B placed below the first link arm 61 is turnably connected to the second end of the rocker arm 63A below the upper pin 64 via a lower pin 66B.

A fixed support portion 61b on the second end of the first link arm 61 is turnably supported by the rocker arm shaft 67. Movable support portions 62Ab and 62Bb on the second end of the second link arms 62A and 62B are turnably supported by a movable shaft 68a of a crank member 68. Also, the second link arms 62A and 62B are shorter than the first link arm 61, and the movable support portions 62Ab and 62Bb on the second ends of the second link arms 62A and 62B are located closer to the intake valves 19 than the fixed support portion 61b on the second end of the first link arm 61.

A housing portion 60 capable of housing the movable support portions 62Ab and 62Bb is formed in the first link arm 61 in such a way that a straight line L2 linking the first connecting portions 61a, 61a of the first link arm 61 with flanks of the second link arms 62A and 62B of the fixed support portion 61b will overlap with part of the movable support portions 62Ab and 62Bb as viewed laterally when at least the movable support portions 62Ab and 62Bb on the second ends of the second link arms 62A and 62B are placed at the closest point to the first link arm 61.

Incidentally, a predetermined difference OS has been set between the center positions of the lower pins 66A and 66B which turnably connect the first ends of the second link arms 62A and 62B to the second ends of the rocker arms 63A and 63b. Consequently, the second link arms 62A and 62B differ from each other in length. That is, the link mechanisms 50A and 50B for the respective rocker arms 63A and 63B for the respective intake valves 19 have geometries different from each other.

Due to the geometric differences between the link mechanisms 50A and 50B, the locus of the center of the upper pin 64 which connects the first link arm 61 to the rocker arms 63A and 63B is common to the link mechanisms 50A and 50B, but the loci of the centers of the lower pins 66A and 66B which connect the second link arms 62A and 62B to the rocker arms 63A and 63B differ from each other. Thus, the two intake valves 19 have mutually different lift characteristics as indicated by the solid line and chain line in FIG. 18. This results in difference in the openings of the two intake valves 19. The difference in the openings has significant effects especially in a low opening region, causing intake air flow to whirl in a combustion chamber 15.

Although it is possible to increase the difference in the openings in the low opening region and decrease the difference in the openings in the high opening region by adjusting the place where the lower pins 66A and 66B are mounted on the rocker arms 63A and 63B, the difference in the openings of the two intake valves 19 has a relatively small effect in the high opening region and will not cause a drop in engine output.

The difference in the openings of the two intake valves 19 can be adjusted easily by adjusting the advance/retract positions of the adjustment bolts 70 screwed into the rocker arms 63A and 63b and by varying clearances between the stems 19a of the intake valves 19 and adjustment bolts 70. That is, a small tappet clearance reduces errors in mechanical linkage between the rocker arms 63A and 63B and intake valves 19, resulting in an opening responsive to the lift amount of valve operating cam 69 while a large tappet clearance reduces the contribution of the action of the valve operating cam 69 to follow the rocker arms 63A and 63B to valve opening strokes of the intake valves 19. By varying the opening between the intake valves 19 based on this principle, it is possible to enhance swirling effects. Naturally, the difference in tappet clearance affects the entire operating range, but it does not cause a drop in engine output as described above because the difference in the opening has a smaller effect as it becomes larger.

Figure 18:
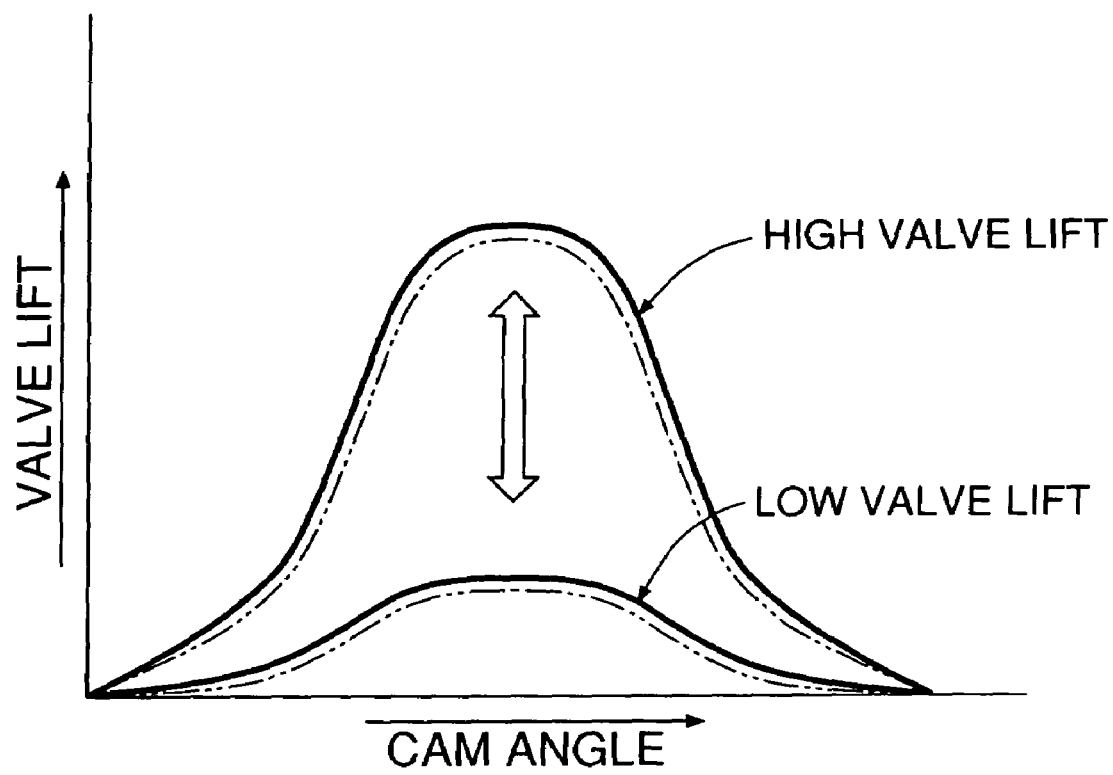
FIG. 18 is a diagram showing a valve lift curve of an intake valve. (Embodiment 3)
Figure 19:
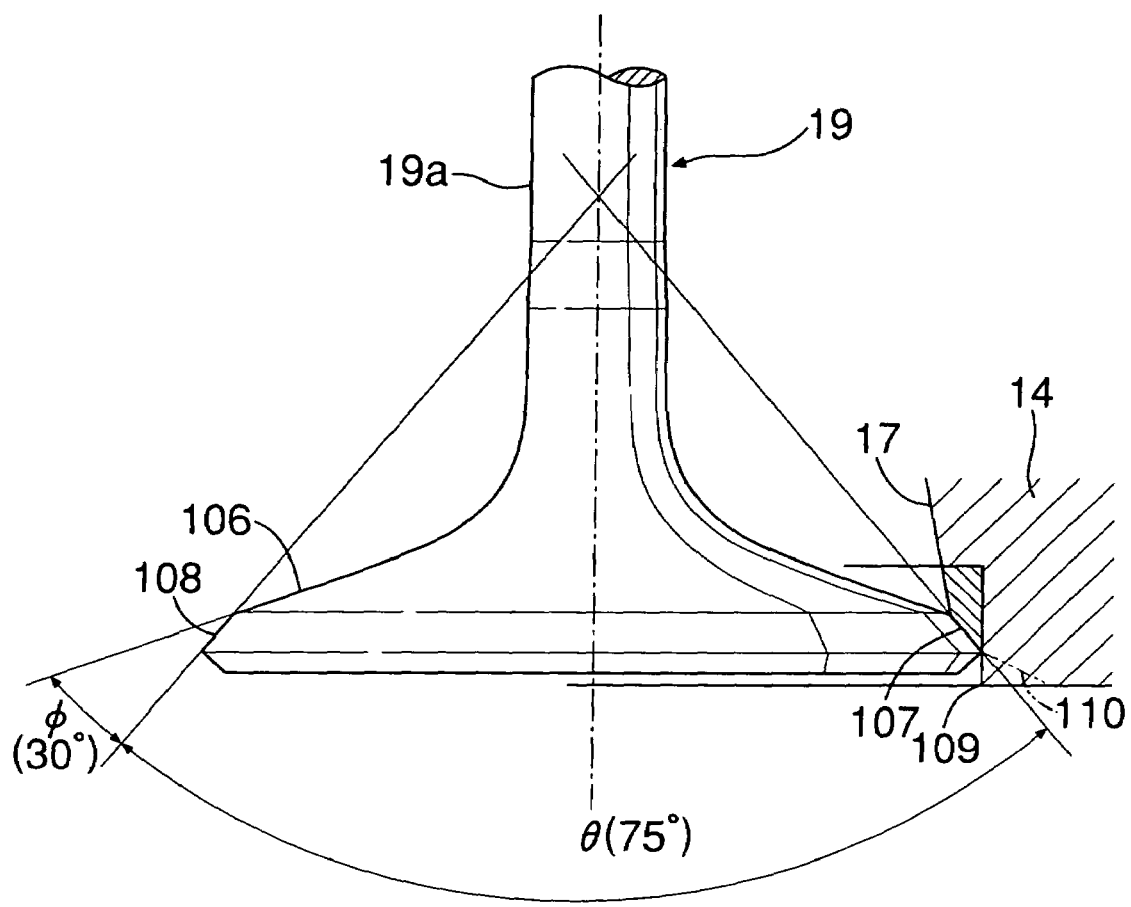
FIG. 19 is an enlarged longitudinal sectional view of essential part of the intake valve. (Embodiment 3)
Figure 20A:
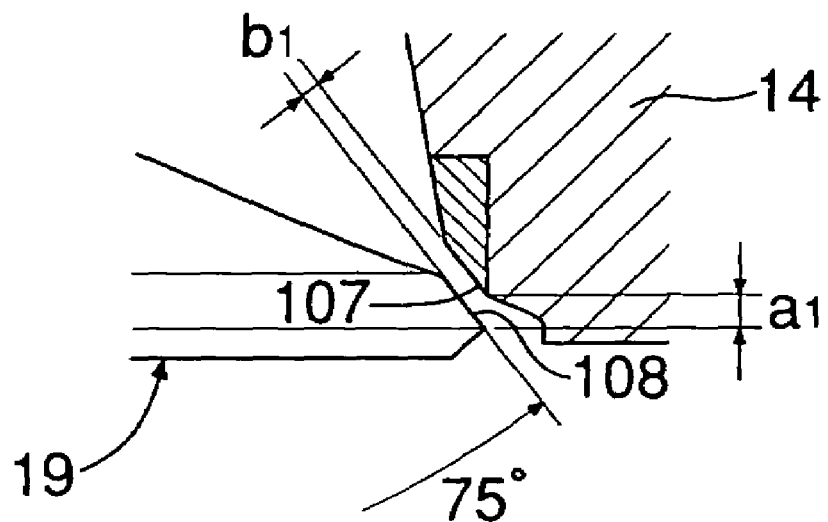
FIG. 20A is a partial enlarged view of FIG. 19 in the state in which a valve seat angle is narrow. (Embodiment 3)
Figure 20B:
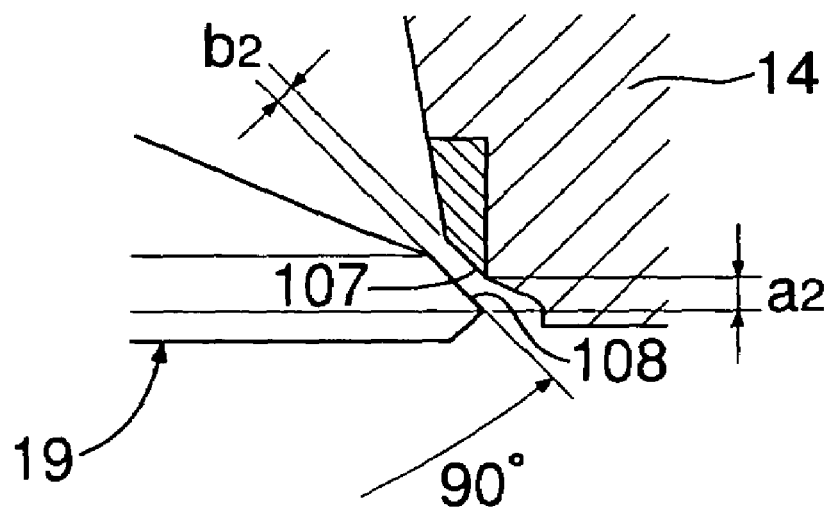
FIG. 20B is a partial enlarged view of FIG. 19 in the state in which a valve seat angle is wide. (Embodiment 3)

As shown in FIG. 18, a surface which abuts a valve seat 107 of an umbrella-shaped portion 106 of the mushroom-shaped intake valve 19, i.e., a seat surface 108, is chamfered to form a predetermined valve seat angle $\theta$ and preferably, the valve seat angle $\theta$ is 75 degrees or less while the angle $\phi$ formed by the seat surface 108 and an outer surface of the umbrella-shaped portion 106 is 30 degrees or more. Incidentally, when the umbrella-shaped portion 106 has curved contours, the above condition is satisfied if any part of the curved surface has a tangent (defined as a straight line linking two points 3 mm apart on the top face of the umbrella-shaped portion 106) of 30 degrees or more.

Since effective clearance ($b_1 < b_2$ in FIG. 20A and FIG. 20B) for the same lift amount ($a_1 = a_2$ in FIG. 20A and FIG. 20B) is reduced with decreases in the valve seat angle $\theta$, the above settings are useful in reducing changes in the effective valve-opening area for the same valve lift amount in the low lift region of the intake valves 19 (2 mm or less in the case of an automobile). This makes it possible to reduce errors or variations in the openings of variable valve lift intake valves 19 in the low lift region caused by temperature changes and manufacturing errors. Also, when controlling the amount of intake by controlling the valve lift amount, responsiveness of changes in the amount of intake to changes in the valve lift amount in the low lift region does not become excessive and stability can be enhanced without decreasing accuracy. In addition, the vertical velocity at which valve seat 107 sits on the seat surface 108 falls with decreases in the valve seat angle $\theta$, and thus reduction in the valve seat angle $\theta$ is effective in reducing noise.

On the other hand, the angle $\phi$ formed by the seat surface 108 and the outer surface of the umbrella-shaped portion 106 increases gradually from zero, intake air flows along the contours of the umbrella-shaped portion 106 at first, but when the angle φ approaches 30 degrees, the intake air flow tends to separate partially from the seat surface 108, increasing intake resistance. When this angle exceeds 30 degrees, the intake air flow separates completely from the seat surface 108, reducing the intake resistance.

Conversely, when the angle φ is smaller than 30 degrees, although the intake resistance is reduced, the umbrella-shaped portion 106 increases in volume, causing the intake valves 19 to increase in inertial mass and reducing the effective port area upstream of the seat surface 108.

Figure 21:
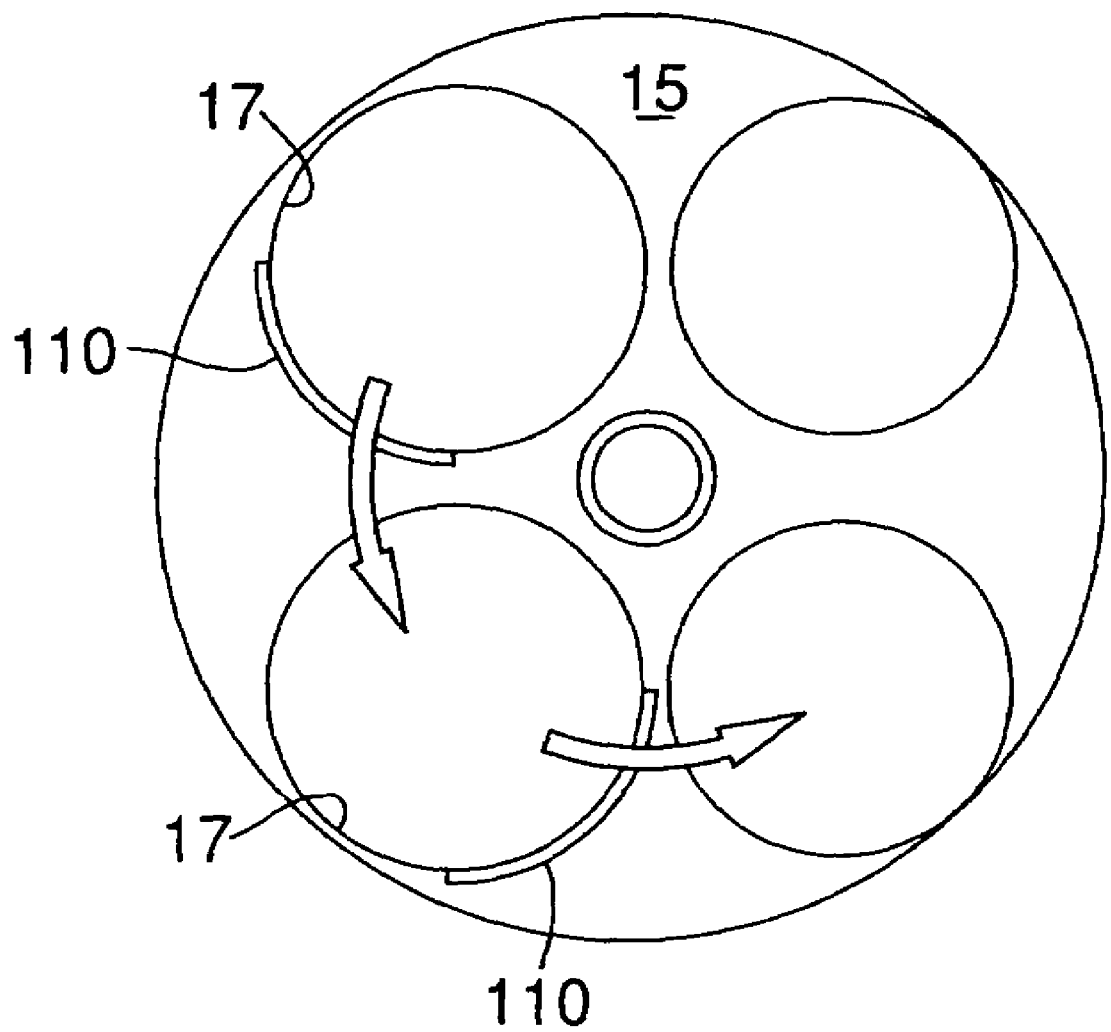
FIG. 21 is a conceptual diagram of a ceiling surface of a combustion chamber. (Embodiment 3)

An open end of an intake port 17 into the combustion chamber 15 has a portion (called a shroud) 109 protruding further toward an inner surface of the intake valve 19 than the combustion chamber 15. If a guide surface 110 which facilitates the swirl of the intake air flow is constructed by cutting off part of the shroud 109 as shown in FIG. 21, it is possible to further enhance swirling effects.

The present invention is not limited to the embodiments described above and allows various design changes without departing from the scope of the present invention set forth in the appended claims.

The invention claimed is:

1. An engine valve operating system, comprising:
   a rocker arm (63, 63A, 63B) which has a cam-abutting portion (65) to abut a valve operating cam (69) and whose first end is coupled in operative association with an engine valve (19);
   a link mechanism (50, 50A, 50B) equipped with a first link arm (61) which has a first connecting portion (61a) at a first end to be turnably connected to the rocker arm (63, 63A, 63B) and has a fixed support portion (61b) at the second end to be turnably supported at a fixed position on an engine body (10) as well as with a second link arm (62, 62A, 62B) which has a second connecting portion (62a, 62Aa, 62Ba) at a first end to be turnably connected to the rocker arm (63, 63A, 63B) and has a movable support portion (62b, 62Ab, 62Bb) at the second end to be turnably supported by a movable shaft (68a) which is displaceable; and
   drive means (72) connected to the movable shaft (68a), being capable of displacing the movable shaft (68a) in order to vary a lift amount of the engine valve (19) continuously,
   characterized in that the first and second connecting portions (61a, 62a) are arranged in parallel and relatively turnably connected to the second end of the rocker arm (63, 63A, 63B) and the movable support portion (62b, 62Ab, 62Bb) of the second link arm (62, 62A, 62B) is placed nearer to the engine valve (19) than the fixed support portion (61b) of the first link arm (61).

2. The engine valve operating system according to claim 1, wherein a housing portion (60) capable of housing the movable support portion (62b, 62Ab, 62Bb) is formed in the first link arm (61) in such a way that a straight line (L2) linking the first connecting portions (61a) of the first link arm (61) with the flank of the fixed support portion (61b) on the side of the second link arm (62, 62A, 62B) overlap with part of the movable support portion (62b) as viewed laterally when at least the movable support portion (62b, 62Ab, 62Bb) is placed at the closest point to the first link arm (61).

3. The engine valve operating system according to claim 2, wherein the first link arm (61) is formed into a U shape with a pair of first connecting portions (61a) which sandwiches the rocker arm (63, 63A, 63B) from both sides, the fixed support portion (61b), and a pair of arm portions (61c) which link the first connecting portions (61a) and the fixed support portion (61b); and at least part of the housing portion (60) is formed between the two arm portions (61c).

4. The engine valve operating system according to claim 2 or 3, wherein the housing portion (60) can house at least part of the movable shaft (68a).

5. The engine valve operating system according to claim 1, wherein the rocker arm (63) is equipped at the first end with a pair of bolt mounting portions (63a) into which adjustment bolts (70) are screwed, the adjustment bolts (70) having adjustable advance/retract positions and abutting a pair of engine valves (19), respectively; and on the rocker arm (63), a rib (63b) is installed between the bolt mounting portions (63a) and sticks out from the first end of the rocker arm (63) to the cam-abutting portion (65).

6. The engine valve operating system according to claim 5, wherein the first link arm (61) is formed into a U shape with a pair of first connecting portions (61a) which sandwiches the rocker arm (63) from the opposite sides, the fixed support portion (61b) turnably supported at a fixed position on the engine body (10), and a pair of arm portions (61c) which link the connecting portions (61a) and the fixed support portion (61b); and the second link arm (62) is formed into a flat shape so as to be placed between the two arm portions (61c) as viewed orthgonally to a straight line (L1) which links rotational axes at opposite ends of the first link arm (61).

7. The engine valve operating system according to claim 5 or 6, wherein the first end of the first link arm (61) is turnably connected to the rocker arm (63, 63A, 63B) via a pin (64); a roller (65) serving as the cam-abutting portion is supported via the pin (64); and an outer flank of that part of the rocker arm (63, 63A, 63B) which opposes a camshaft (31) equipped with the valve operating cam (69) overlaps with an outer flank of the first end of the first link arm (61) as viewed laterally, forming an arc shape around the axis of the pin (64).

8. The engine valve operating system according to claim 5 or 6, comprising a crank member (68) on opposite ends of a connection plate (68b), where the movable shaft (68a) and a spindle (68c) whose axis is parallel to the movable shaft (68a) stick out from the crank member (68), wherein the spindle (68c) is turnably supported on the engine body (10).

9. The engine valve operating system according to claim 1, wherein the link mechanisms (50A, 50B) for the respective rocker arms (63A and 63B) for respective intake valves (19) which are the engine valves have geometries different from each other.

10. The engine valve operating system according to claim 9, wherein a movable shaft (68a) which supports movable support portions (62Ab, 62Bb) of second link arms (62A, 62B) of the respective link mechanisms (50A, 50B) is installed on a common crank member (68) turnably supported on the engine body (10).

11. The engine valve operating system according to claim 1, wherein a cam holder (46) with a bearing hole (86) which receives and turnably supports a journal portion (31a) of a camshaft (31) on which the valve operating cam (69) is mounted is installed on the engine body (10); a supply hole (88) whose inner end is communicated with an oil path (87) provided in the camshaft (31) to supply lubricant externally is installed in the journal portion (31a) in such a way as to open an outer end of the supply hole (88) to outer periphery of the journal portion (31a); a receiving groove (89) corresponding to the outer end of the supply hole (88) is provided in at least part of inner periphery of the bearing hole (86); a communicating channel (90) is provided in the cam holder (46), linking an oil jet (91) with the receiving groove (89), where the oil jet (91) is placed in opposing relation to particular parts out of the engine valve (19), rocker arm (63, 63A, 63B), and link mechanism (50, 50A, 50B); and the location and shape of the receiving groove (89) are determined such that the receiving groove (89) is communicated with the outer end of the supply hole (88) within a particular rotational angle range of the camshaft (31).

12. The engine valve operating system according to claim 1, wherein an oil sump (98) is installed in an upper part of the fixed support portion (61b) of the first link arm (61) placed above the second link arm (62, 62A, 62B), the oil sump (98) bordering on the outer circumference of a rocker arm shaft (67) which penetrates the fixed support portion (61b) so as to turnably support the fixed support portion (61b); an oil path (99) which allows lubricant to be supplied externally is installed in a cam holder (46) installed on the engine body (10) so as to turnably support a journal portion (31a) of a camshaft (31) on which the valve operating cam (69) is mounted; and an oil supply pipe (100) which drops lubricant into the oil sump (98) from above is installed in a protruding condition so as to be communicated with the oil path (99).

* * * * *